US010372102B2

(12) United States Patent
Osaki et al.

(10) Patent No.: US 10,372,102 B2
(45) Date of Patent: Aug. 6, 2019

(54) CONTROL METHOD FOR AIR CONDITIONER, TERMINAL DEVICE, AND OPERATION CONTROL SYSTEM

(71) Applicant: Panasonic Intellectual Property Management Co., Ltd., Osaka (JP)

(72) Inventors: Yuji Osaki, Osaka (JP); Chieko Sasaki, Osaka (JP); Masao Nonaka, Osaka (JP); Hiroko Sugimoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 94 days.

(21) Appl. No.: 15/354,383

(22) Filed: Nov. 17, 2016

(65) Prior Publication Data

US 2017/0176041 A1    Jun. 22, 2017

(30) Foreign Application Priority Data

Dec. 18, 2015  (JP) .................................. 2015-247111
Aug. 3, 2016   (JP) .................................. 2016-152508

(51) Int. Cl.
  *G05B 19/10*      (2006.01)
  *F24F 11/64*      (2018.01)
  (Continued)

(52) U.S. Cl.
  CPC ............ *G05B 19/106* (2013.01); *F24F 11/46* (2018.01); *F24F 11/52* (2018.01); *F24F 11/56* (2018.01);
  (Continued)

(58) Field of Classification Search
  None
  See application file for complete search history.

(56) References Cited

U.S. PATENT DOCUMENTS 4,418,744 A * 12/1983 Sidebottom ........ G05D 23/1912
                                                      165/265
2010/0306694 A1* 12/2010 Conzola .............. G06F 3/04847
                                                      715/786
(Continued)

FOREIGN PATENT DOCUMENTS

WO    2014/064792    5/2014

OTHER PUBLICATIONS

The Extended European Search Report dated May 23, 2017 for European Patent Application No. 16200378.4.

*Primary Examiner* — Brian W Wathen
*Assistant Examiner* — Hung H Dang
(74) *Attorney, Agent, or Firm* — Greenblum & Bernstein, P.L.C.

(57) ABSTRACT

An operation mode selection image represents a first selection range of values of power consumption setting that are selectable in a first mode at the time of purchase of an air conditioner, a second selection range values of power consumption setting that are selectable in the first mode at a current time, a third selection range values of power consumption setting that are selectable in a second mode at the time of purchase of the air conditioner, and a fourth selection range values of power consumption setting that are selectable in the second mode at the current time. The relationship between the sizes of the first and second selection ranges and the relationship between the sizes of the third and fourth selection ranges represent a degree of decrease in the performance of the air conditioner over the period from the time of purchase to the current time.

12 Claims, 29 Drawing Sheets

(51) Int. Cl.
    *F24F 11/65*   (2018.01)
    *F24F 11/56*   (2018.01)
    *F24F 11/46*   (2018.01)
    *F24F 11/52*   (2018.01)
    *F24F 140/60*  (2018.01)

(52) U.S. Cl.
    CPC .............. *F24F 11/64* (2018.01); *F24F 11/65* (2018.01); *F24F 2140/60* (2018.01); *G05B 2219/2614* (2013.01)

(56) References Cited

U.S. PATENT DOCUMENTS

| | | | |
|---|---|---|---|
| 2011/0258607 A1* | 10/2011 | Bhatt | G06F 11/3608 |
| | | | 717/126 |
| 2012/0017630 A1* | 1/2012 | Okabe | B05B 5/16 |
| | | | 62/407 |
| 2014/0163746 A1 | 6/2014 | Drew et al. | |
| 2014/0317218 A1 | 10/2014 | Chiba | |
| 2015/0094865 A1 | 4/2015 | Choi et al. | |
| 2015/0184880 A1 | 7/2015 | Kawamura | |
| 2015/0330652 A1* | 11/2015 | Kim | F24F 11/006 |
| | | | 700/276 |
| 2016/0169545 A1* | 6/2016 | Mangsuli | G05B 13/0205 |
| | | | 700/276 |

* cited by examiner

FIG. 6

| COLLECTION TIME | MODEL NUMBER | PRODUCT SERIAL NUMBER | OPERATING STATE | SET TEMPERATURE | INDOOR TEMPERATURE | COMPRESSOR ROTATIONAL SPEED | INDOOR FM ROTATIONAL SPEED | ... | CONTROL PARAMETER NO. | COMPRESSOR TARGET ROTATIONAL SPEED | INDOOR FM TARGET ROTATIONAL SPEED | ... | POWER CONSUMPTION | COOLING CAPACITY |
|---|---|---|---|---|---|---|---|---|---|---|---|---|---|---|
| ... | ... | ... | ... | ... | ... | ... | ... | ... | ... | ... | ... | ... | ... | ... |
| JULY 4, 2015 12:05 | AC-001 | 1234 | COOLING | 25 | 30 | 58 | 445 | ... | 4 | 60 | 450 | ... | 200 | 2.1 |
| JULY 4, 2015 12:10 | AC-001 | 1234 | COOLING | 27 | 29 | 48 | 330 | ... | 4 | 50 | 340 | ... | 180 | 2.0 |
| JULY 4, 2015 12:15 | AC-001 | 1234 | OFF | — | 28 | — | — | ... | — | — | — | ... | — | — |
| ... | ... | ... | ... | ... | ... | ... | ... | ... | ... | ... | ... | ... | ... | ... |

Columns grouped as: OPERATING STATE AND SENSOR DATA | CONTROL PARAMETER | PERFORMANCE

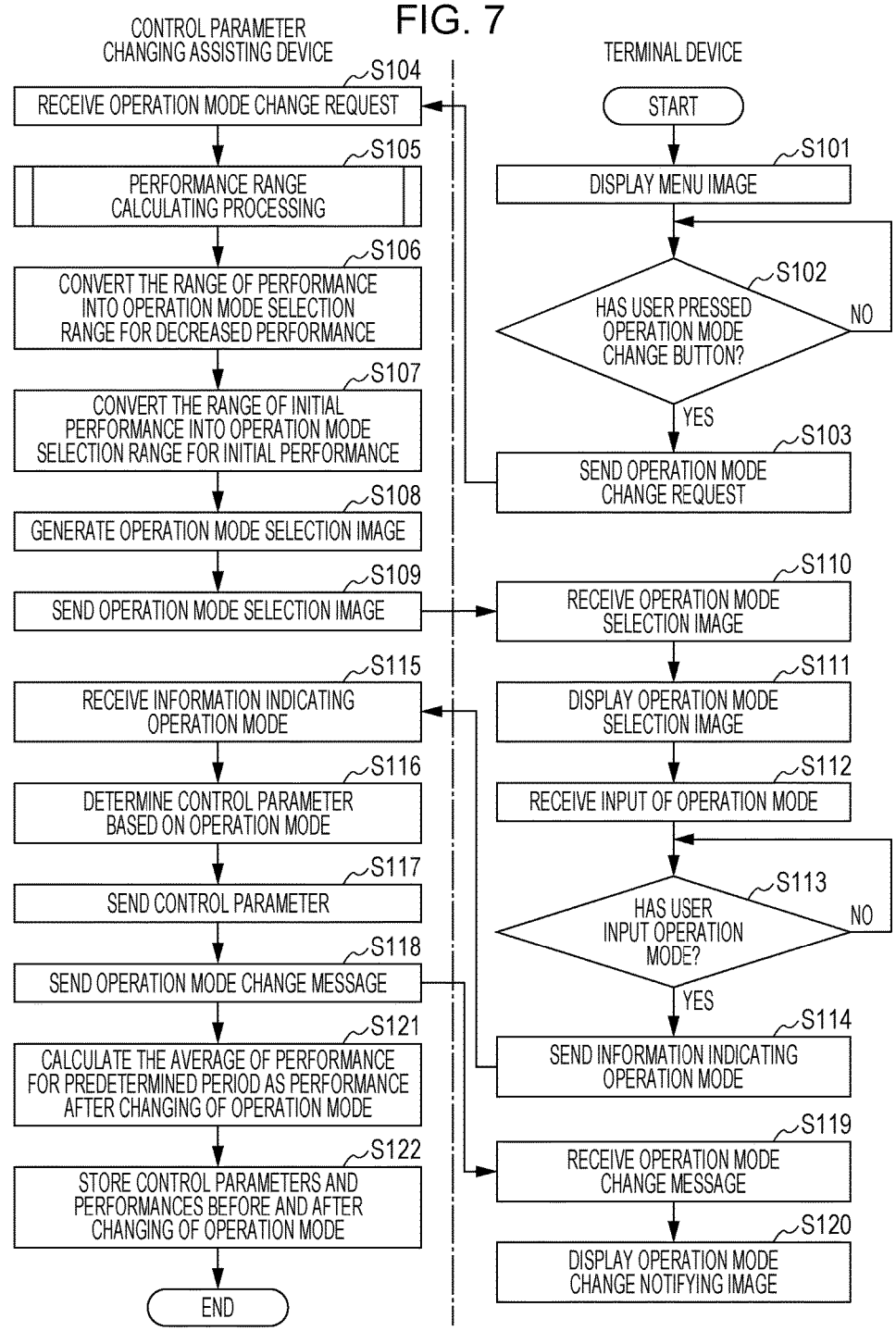

FIG. 12

| OPERATION MODE CHANGE TIME | MODEL NUMBER | PRODUCT SERIAL NUMBER | FIRST COMBINATION ||| SECOND COMBINATION |||
|---|---|---|---|---|---|---|---|---|
| | | | CONTROL PARAMETER NO. | COOLING CAPACITY | POWER CONSUMPTION | CONTROL PARAMETER NO. | COOLING CAPACITY | POWER CONSUMPTION |
| ... | ... | ... | ... | ... | ... | ... | ... | ... |
| JUNE 5, 2015 12:05 | AC-001 | 3456 | 4 | 2.0 | 190 | 9 | 1.7 | 130 |
| JUNE 5, 2015 12:07 | AC-001 | 5432 | 4 | 1.8 | 500 | 12 | 1.4 | 300 |
| JUNE 5, 2015 13:00 | AC-002 | 2345 | 6 | 1.9 | 700 | 1 | 2.1 | 800 |
| ... | ... | ... | ... | ... | ... | ... | ... | ... |

CONTROL METHOD FOR AIR CONDITIONER, TERMINAL DEVICE, AND OPERATION CONTROL SYSTEM

BACKGROUND

1. Technical Field

The present disclosure relates to a control method for an air conditioner, a terminal device, and an operation control system.

2. Description of the Related Art

The performance of an air-conditioner decreases due to various factors, such as the frequency of use, state of use, and age of service. For example, aging of an air conditioner over time may cause a small leakage of a refrigerant from a pipe, which decreases the cooling capacity or the heating capacity of the air conditioner. Aging of parts of an air-conditioner, such as a fan motor, may decrease the amount of airflow. Additionally, these factors may increase the power consumption of an air conditioner.

The monitoring system disclosed in International Publication No. 2014/064792 determines whether or not a breakdown of an air conditioner is caused by aging in accordance with whether the rate of change in the refrigeration capacity of the air conditioner with respect to the time exceeds an abnormality value.

SUMMARY

However, although a monitoring system of the related art, such as the above-described monitoring system, is able to determine whether a breakdown of an air conditioner is caused by aging, it is unable to check how much the performance of the air conditioner has decreased due to aging.

In one general aspect, the techniques disclosed here feature a control method for an air conditioner. The control method includes: causing a terminal device to display a first image, the first image including a first interface for selecting whether to change an operation mode of the air conditioner, the operation mode including a first mode of power consumption and a second mode of power consumption; causing the terminal device to display a second image upon receiving, from the terminal device, first information indicating a selection to change the operation mode, the second image including: a first range of values of power consumption setting that are selectable in the first mode at a time of purchase of the air conditioner, a second range contained within the first range and indicating a range of values of power consumption setting that are selectable in the first mode at a current time, a third range of values of power consumption setting that are selectable in the second mode at the time of purchase of the air conditioner, a fourth range contained within the third range and indicating a range of values of power consumption setting that are selectable in the second mode at the current time, a relationship between a size of the first range and a size of the second range representing a degree of decrease in performance of the air conditioner in the first mode over a period from the time of purchase to the current time, a relationship between a size of the third range and a size of the fourth range representing a degree of decrease in the performance of the air conditioner in the second mode over a period from the time of purchase to the current time, and a second interface for selecting a target value of power consumption setting on the second and fourth ranges; receiving, from the terminal device, second information indicating a current operation mode and the target value of power consumption setting of the current operation mode selected using the second interface; and sending, to the air conditioner, a command for controlling the air conditioner by using the current operation mode and the target value of power consumption setting of the current operation mode.

These general and specific aspects may be implemented using a system, a method, and a computer program, and any combination of systems, methods, and computer programs.

According to an aspect of the present disclosure, the range of the decreased performance of an air conditioner is converted into an operation mode selection range for the decreased performance, and an operation mode selection image indicating the operation mode selection range for the decreased performance is displayed. This makes it possible to present the range of the operation mode of the air conditioner that is selectable by a user in accordance with the decreased performance and also to operate the air conditioner within the operation mode selection range for the decreased performance.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates a table indicating examples of the operating state, control parameter, and performance stored in a storage unit;

FIG. 7 is a flowchart illustrating control parameter changing processing in the first embodiment;

FIG. 12 illustrates a table indicating an example of a first combination of a previous control parameter and the corresponding performance and an example of a second combination of a current control parameter and the corresponding performance;

DETAILED DESCRIPTION

Figure 1:
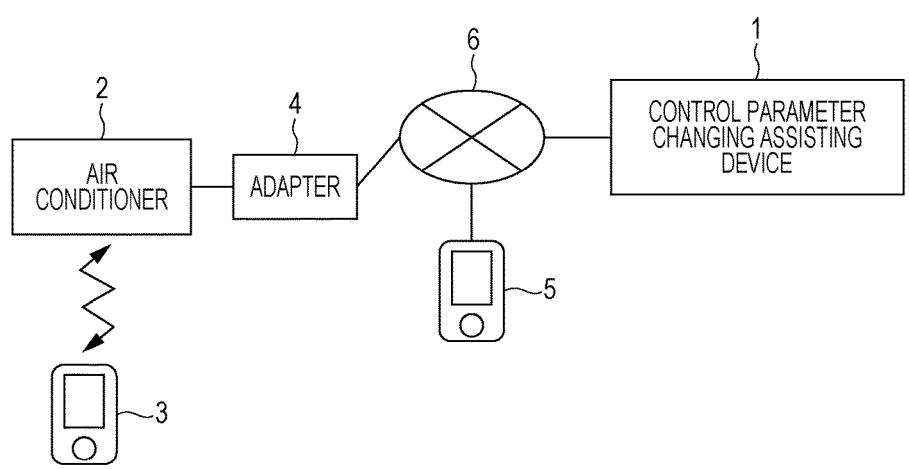
FIG. 1 is a schematic diagram illustrating an example of the configuration of an operation control system in a first embodiment of the present disclosure.

The underlying knowledge forming the basis of the present disclosure will be discussed below.

As described above, although a monitoring system of the related art is able to determine whether a breakdown of an air conditioner is caused by aging, it is unable to check how much the performance of the air conditioner has decreased due to aging.

In view of this background, the present inventor has examined the following measures to improve a monitoring system of the related art.

(1) According to an aspect of the present disclosure, there is provided a control method for an air conditioner. The control method includes: a terminal device to display a first image, the first image including a first interface for selecting whether to change an operation mode of the air conditioner, the operation mode including a first mode of power consumption and a second mode of power consumption; causing the terminal device to display a second image upon receiving, from the terminal device, first information indicating a selection to change the operation mode, the second image including: a first range of values of power consumption setting that are selectable in the first mode at a time of purchase of the air conditioner, a second range contained within the first range and indicating a range of values of power consumption setting that are selectable in the first mode at a current time, a third range of values of power consumption setting that are selectable in the second mode at the time of purchase of the air conditioner, a fourth range contained within the third range and indicating a range of values of power consumption setting that are selectable in the second mode at the current time, a relationship between a size of the first range and a size of the second range representing a degree of decrease in performance of the air conditioner in the first mode over a period from the time of purchase to the current time, a relationship between a size of the third range and a size of the fourth range representing a degree of decrease in the performance of the air conditioner in the second mode over a period from the time of purchase to the current time, and a second interface for selecting a target value of power consumption setting on the second and fourth ranges; receiving, from the terminal device, second information indicating a current operation mode and the target value of power consumption setting of the current operation mode selected using the second interface; and sending, to the air conditioner, a command for controlling the air conditioner by using the current operation mode and the target value of power consumption setting of the current operation mode.

This makes it possible to present the range of the operation mode of the air conditioner that is selectable by the user in accordance with the decreased performance and also to operate the air conditioner within the operation mode selection range for the decreased performance.

(2) In the above-described control method, the first mode may be a high power mode, and the second mode may be a power-saving mode.

Enhancing of the cooling capacity or the heating capacity of the air conditioner increases its power consumption. Reducing of the power consumption of the air conditioner decreases its cooling capacity or heating capacity. The cooling capacity or the heating capacity and the power consumption of the air conditioner thus have a tradeoff relationship. The user can select an operation mode in a stepwise manner within a range between the two operation modes having a tradeoff relationship, that is, between the high power mode and the power-saving mode.

(3) The above-described control method may further include: receiving, from the air conditioner, third information indicating that the air conditioner is powered ON; determining whether an elapsed time, from a time at which the operation mode was previously changed to a time at which the third information is received, exceeds a predetermined period; and causing the terminal device to display the first image if it is determined that the elapsed time exceeds the predetermined period.

This configuration makes it possible to determine whether to change the operation mode in accordance with the elapsed time from a time at which the operation mode has previously changed to a time at which the third information is received from the air conditioner.

(4) In the above-described control method, the second image may also indicate a previous operation mode that was used before the current operation mode and a target value of the power consumption setting that was selected in the previous operation mode.

This configuration enables the user to change the operation mode by checking the previous operation mode and the magnitude thereof.

(5) In the above-described control method, the second image may have a bar-like shape. A range of values of power consumption setting from a first reference point between a first end and a second end of the second image to the first end may correspond to the first range, a range of values of power consumption setting from the first reference point to the second end may correspond to the third range, a range of values of power consumption setting from the first reference point to a second reference point within the first range may correspond to the second range, and a range of values of power consumption setting from the first reference point to a third reference point within the third range may correspond to the fourth range. The second interface may be slidable from the second reference point to the third reference point.

This configuration enables the user to select a desired position on the bar-like second image and thus to determine the operation mode and the magnitude thereof in accordance with the selected position. Consequently, the user is able to select the operation mode intuitively.

(6) In the above-described control method, the second image may have an arc-like shape. A range of values of power consumption setting from a first reference point between a first end and a second end of the second image to the first end may correspond to the first range, a range of values of power consumption setting from the first reference point to the second end may correspond to the third range, a range of values of power consumption setting from the first reference point to a second reference point within the first range may correspond to the second range, and a range of values of power consumption setting from the first reference point to a third reference point within the third range may correspond to the fourth range. The second interface may be slidable from the second reference point to the third reference point.

This configuration enables the user to select a desired position on the arc-like second image and thus to determine the operation mode and the magnitude thereof in accordance with the selected position. Consequently, the user is able to select the operation mode intuitively.

(7) In the above-described control method, the second image may include a plurality of numbers arranged symmetrically with respect to a number 0. Among the plurality of numbers, numbers from the number 0 to a left end of the second image may be consecutively incremented one by one, while numbers from the number 0 to a right end of the second image may be consecutively incremented one by one. Numbers from the number 0 to the left end may correspond to the first range, numbers from a first number, which is positioned closer to the number 0 than the left end is, to the number 0 may correspond to the second range, numbers from the number 0 to the right end may correspond to the third range, and numbers from a second number, which is positioned closer to the number 0 than the right end is, to the number 0 may correspond to the fourth range. Numbers in a range from the first number to the second number may be selectable using the second interface.

This configuration enables the user to select a desired number on the second image including a plurality of numbers arranged symmetrically with respect to 0 and thus to determine the operation mode and the magnitude thereof in accordance with the selected number. Consequently, the user is able to select the operation mode intuitively.

(8) The above-described control method may further include: obtaining fourth information indicating an association between individual values of power consumption setting of the second range and parameter sets for operating the air conditioner and an association between individual values of power consumption setting of the fourth range and parameter sets for operating the air conditioner; and selecting a parameter set for operating the air conditioner, based on the second information and the fourth information. The command may include a command for controlling the air conditioner by using the selected parameter set.

This configuration makes it possible to select the parameter set for operating the air conditioner in accordance with the point within the second range or the fourth range selected by the user and thus to operate the air conditioner in accordance with the selected parameter set.

(9) In the above-described control method, the air conditioner may include a compressor and a fan motor. The parameter set may indicate a target rotational speed of the compressor and a target rotational speed of the fan motor.

This configuration makes it possible to determine the target rotational speed of the compressor and that of the fan motor in accordance with the point within the second range or the fourth range selected by the user and thus to operate the air conditioner in accordance with the determined target rotational speed of the compressor and that of the fan motor.

(10) According to another aspect of the present disclosure, there is provided a terminal device for receiving a selection of an operation mode of an air conditioner. The terminal device includes a processor; a monitor; and a communicator, wherein the processor controls the monitor to display a first image, the first image including a first interface for selecting whether to change an operation mode of the air conditioner, the operation mode including a first mode of power consumption and a second mode of power consumption, the processor controls the monitor to display a second image when a selection to change the operation mode is received, the second image including: a first range of values of power consumption setting that are selectable in the first mode at a time of purchase of the air conditioner, a second range contained within the first range and indicating a range of values of power consumption setting that are selectable in the first mode at a current time, a third range of values of power consumption setting that are selectable in the second mode at the time of purchase of the air conditioner, a fourth range contained within the third range and indicating a range of values of power consumption setting that are selectable in the second mode at the current time, a relationship between a size of the first range and a size of the second range representing a degree of decrease in performance of the air conditioner in the first mode over a period from the time of purchase to the current time, a relationship between a size of the third range and a size of the fourth range representing a degree of decrease in the performance of the air conditioner in the second mode over a period from the time of purchase to the current time, and a second interface for selecting a target value of power consumption setting on the second and fourth ranges, and the communicator sends information indicating a current operation mode and the target value of power consumption setting of the current operation mode that is selected using the second interface.

This makes it possible to present the range of the operation mode of the air conditioner that is selectable by the user in accordance with the decreased performance and also to operate the air conditioner within the operation mode selection range for the decreased performance.

(11) According to still another aspect of the present disclosure, there is provided an operation control system including an air conditioner; a terminal device that receives a selection of an operation mode of the air conditioner; and an operation control device that determines a control parameter for controlling an operation of the air conditioner in accordance with the selected operation mode received by the terminal device, and that controls the operation of the air conditioner in accordance with the determined control parameter, the operation control device including a processor, and a communicator, wherein the processor causes the terminal device to display a first image, the first image including a first interface for selecting whether to change the operation mode of the air conditioner, the operation mode including a first mode of power consumption and a second mode of power consumption, the processor causes the terminal device to display a second image upon receiving, from the terminal device, first information indicating a selection to change the operation mode, the second image including: a first range indicating a range of values of power consumption setting that are selectable in the first mode at a time of purchase of the air conditioner, a second range contained within the first range and indicating a range of values of power consumption setting that are selectable in the first mode at a current time, a third range indicating a range of values of power consumption setting that are selectable in the second mode at the time of purchase of the air conditioner, and a fourth range contained within the third range and indicating a range of values of power consumption setting that are selectable in the second mode at the current time, a relationship between a size of the first range and a size of the second range representing a degree of decrease in performance of the air conditioner in the first mode over a period from the time of purchase to the current time, and a relationship between a size of the third range and a size of the fourth range representing a degree of decrease in the performance of the air conditioner in the second mode over a period from the time of purchase to the current time, and a second interface for selecting a target value of power consumption setting on the second and fourth ranges, the communicator receives, from the terminal device, second information indicating a current operation mode and the target value of power consumption setting of the current operation mode selected using the second interface, and the communicator sends, to the air conditioner, a command for controlling the air conditioner by using the current operation mode and the target value of power consumption setting of the current operation mode, the terminal device including a processor, a monitor, and a communicator, wherein the processor controls the monitor to display the first image, the processor controls the monitor to display the second image when a selection to change the operation mode is received, and the communicator sends the second information to the operation control device, the air conditioner including a processor, and a communicator, wherein the communicator receives the command from the operation control device, and the processor operates the air conditioner in accordance with the command.

This makes it possible to present the range of the operation mode of the air conditioner that is selectable by the user in accordance with the decreased performance and also to operate the air conditioner within the operation mode selection range for the decreased performance.

Embodiments of the present disclosure will be described below with reference to the accompanying drawings. It is to be understood that the following embodiments are only examples and are not intended to restrict the technical scope of the disclosure.

First Embodiment

FIG. 1 is a schematic diagram illustrating an example of the configuration of an operation control system in a first embodiment. As shown in FIG. 1, the operation control system includes a control parameter changing assisting device 1, an air conditioner 2, a remote control 3, an adapter 4, and a terminal device 5.

The air conditioner 2 is connected to the remote control 3 so that they can communicate with each other by infrared communication, for example. The adapter 4 is connected to the air conditioner 2 by a wired medium, for example, and serves to connect the air conditioner 2 and a network 6. The adapter 4 may be integrated within the air conditioner 2 or may be connected to the air conditioner 2 wirelessly. The adapter 4 has a protocol conversion function and a packet sending-and-receiving function, as in a gateway, and also has a function of connecting different types of transmission channel media, as in a modem. The adapter 4 may be constituted by one device or by plural devices having the above-described functions and connected to each other via a wired or wireless medium.

The air conditioner 2 is connected to the network 6 via the adapter 4. The network 6 is a general public network, such as the Internet. The remote control 3 may be connected to the network 6 via the air conditioner 2 and the adapter 4. The air conditioner 2 has at least one of a cooling function, a heating function, a dehumidifying function, a humidifying function, and an air purifying function.

The terminal device 5 is a smartphone, a tablet computer, or a personal computer, for example. The terminal device 5 is connected to the network 6 and checks the operating condition of the air conditioner 2 and controls the operation of the air conditioner 2. The terminal device 5 receives an operation mode of the air conditioner 2 from a user. The user may select the operation mode in a stepwise manner.

In the first embodiment, the operation mode includes a first operation mode in which enhancing of the cooling capacity or the heating capacity of the air conditioner 2 is prioritized and a second operation mode in which reducing of the power consumption of the air conditioner 2 is prioritized. The first operation mode is a high power mode, while the second operation mode is a power-saving mode. When the power consumption of the air conditioner 2 is minimized, the cooling capacity or the heating capacity of the air conditioner 2 is also minimized. In contrast, when the cooling capacity or the heating capacity of the air conditioner 2 is maximized, the power consumption of the air conditioner 2 is also maximized.

The control parameter changing assisting device 1 is constituted by a web server, for example. The control parameter changing assisting device 1 is connected to the air conditioner 2 via the network 6 and the adapter 4 so as to communicate with the air conditioner 2. The control parameter changing assisting device 1 monitors the operating state of the air conditioner 2 and collects operating state information including sensor data obtained by sensors of the air conditioner 2. The control parameter changing assisting device 1 is also connected to the terminal device 5 via the network 6 so as to communicate with the terminal device 5. The control parameter changing assisting device 1 is also connected to the remote control 3 via the network 6, the adapter 4, and the air conditioner 2 so as to communicate with the remote control 3. The network 6, which is a general public network, is also connected to other air conditioners and other connecting devices (not shown). This enables the control parameter changing assisting device 1 to communicate with plural air conditioners and plural terminal devices.

The control parameter changing assisting device 1 determines a control parameter for controlling the operation of the air conditioner 2 in accordance with the selected operation mode received by the terminal device 5, and controls the operation of the air conditioner 2 in accordance with the determined control parameter.

Figure 2:
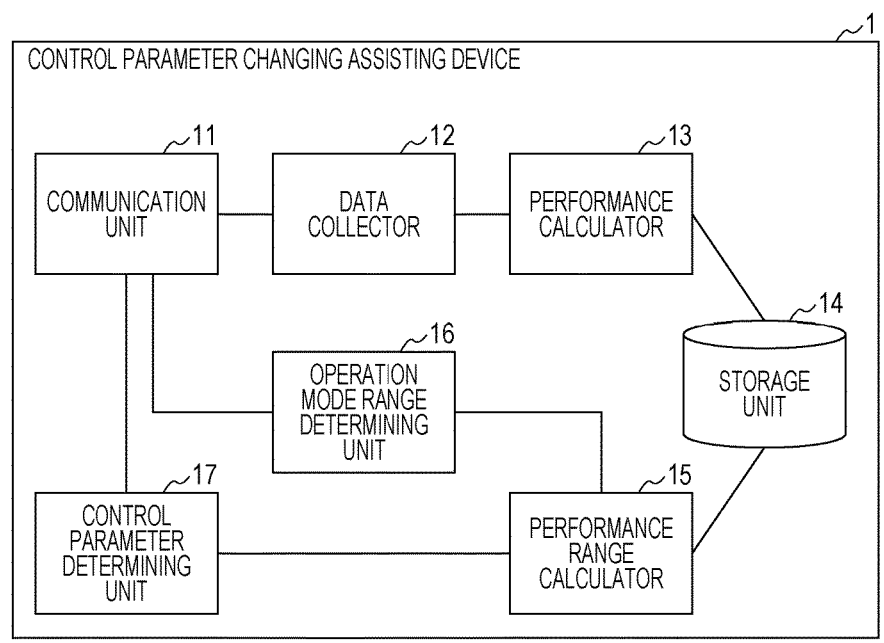
FIG. 2 is a block diagram illustrating an example of the configuration of a control parameter changing assisting device in the first embodiment.

FIG. 2 is a block diagram illustrating an example of the configuration of the control parameter changing assisting device 1 in the first embodiment.

As shown in FIG. 2, the control parameter changing assisting device 1 includes a communication unit 11, a data collector 12, a performance calculator 13, a storage unit 14, a performance range calculator 15, an operation mode range determining unit 16, and a control parameter determining unit 17.

The communication unit 11 serves to connect the control parameter changing assisting device 1 to the network 6.

The data collector 12 obtains the operating state of the air conditioner 2 operated by using a predetermined control parameter and also obtains this predetermined control parameter from the air conditioner 2. The operating state of the air conditioner 2 indicates, for example, whether the air conditioner 2 is performing the cooling operation or the heating operation, or it is turned OFF, the set temperature of the air conditioner 2, and sensor data obtained by various sensors of the air conditioner 2. The sensor data indicates, for example, the indoor temperature, the rotational speed of a compressor, the rotational speed of an indoor fan motor, pipe temperature, and power consumption. The data collector 12 may obtain the operating state of the air conditioner 2 and the control parameter regularly or every time the operating state is changed.

The performance calculator 13 calculates the performance of the air conditioner 2 based on the operating state of the air conditioner 2 obtained by the data collector 12. The performance is represented by a combination of the cooling capacity or the heating capacity and the power consumption of the air conditioner 2. If information obtained from the air conditioner 2 indicates power consumption, the performance calculator 13 utilizes this power consumption to calculate the performance of the air conditioner 2. If information obtained from the air conditioner 2 does not indicate power consumption, the performance calculator 13 calculates power consumption from sensor data, such as the rotational speed of the compressor and the rotational speed of the indoor fan motor, by using a predetermined operational expression or conversion table. The performance calculator 13 also calculates the cooling capacity or the heating capacity from the rotational speed of the indoor fan motor and the pipe temperature by using a predetermined operational expression or conversion table.

The storage unit 14 stores the operating state of the air conditioner 2 and the control parameter obtained by the data collector 12 and the performance calculated by the performance calculator 13. The storage unit 14 also stores the collection time of the operating state, control parameter, and performance and information for identifying the air conditioner 2, such as the model number and the product serial number, together with the operating state, control parameter, and performance.

The performance range calculator 15 calculates the range of the decreased performance of the air conditioner 2 that varies within a range in which the control parameter can be changed.

The operation mode range determining unit 16 converts the range of the decreased performance of the air conditioner 2 calculated by the performance range calculator 15 into an operation mode selection range for the decreased performance. The communication unit 11 sends an operation mode selection image indicating the operation mode selection range for the decreased performance determined by the operation mode range determining unit 16 to the terminal device 5. Instead of the operation mode selection image, the communication unit 11 may directly send the operation mode selection range for the decreased performance to the terminal device 5. In this case, the terminal device 5 generates an operation mode selection image from the received operation mode selection range for the decreased performance and displays the generated image.

The communication unit 11 receives the selected operation mode from the terminal device 5. The control parameter determining unit 17 determines a control parameter in accordance with the operation mode received by the communication unit 11. The communication unit 11 sends a control signal for controlling the air conditioner 2 by using the determined control parameter to the air conditioner 2.

Figure 3:
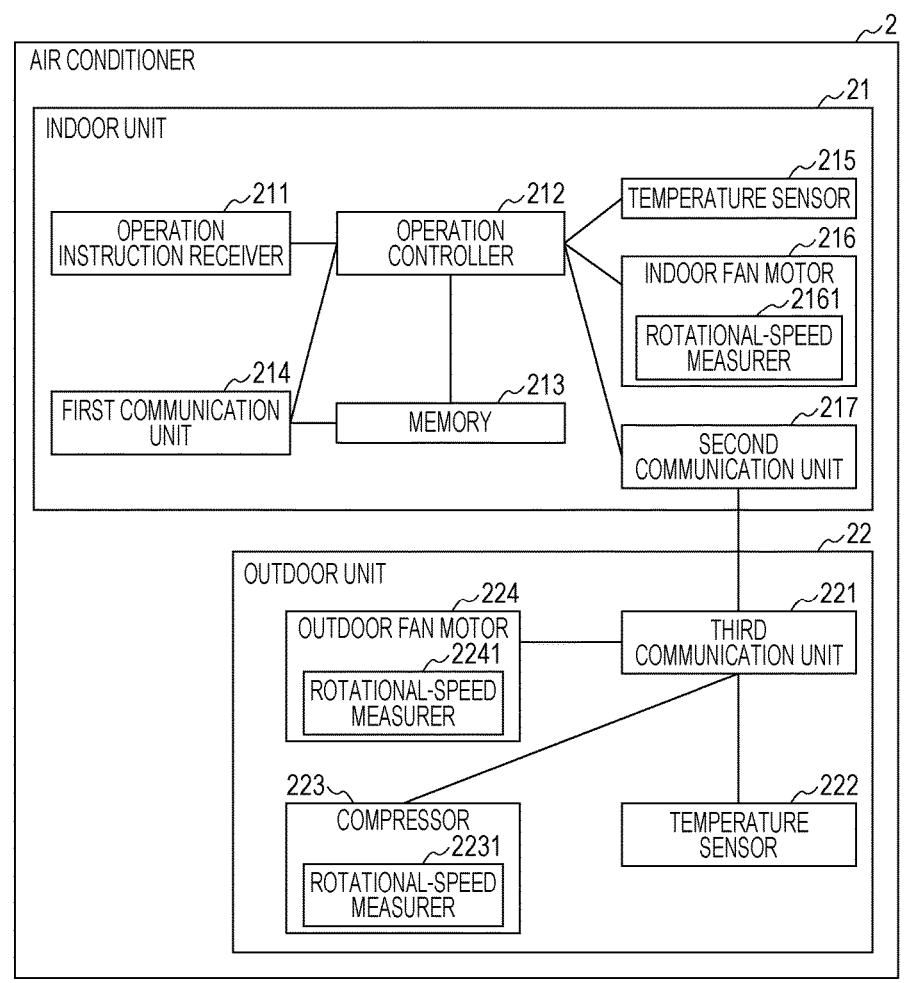
FIG. 3 is a block diagram illustrating an example of the configuration of an air conditioner in the first embodiment.

FIG. 3 is a block diagram illustrating an example of the configuration of the air conditioner 2 in the first embodiment. As shown in FIG. 3, the air conditioner 2 includes an indoor unit 21 and an outdoor unit 22. During the cooling operation, the indoor unit 21 absorbs indoor heat and sends cool air, while the outdoor unit 22 releases heat absorbed by the indoor unit 21. During the heating operation, the outdoor unit 22 absorbs outdoor heat and sends it to the indoor unit 21, while the indoor unit 21 releases heat absorbed by the outdoor unit 22 and sends warm air.

The indoor unit 21 includes an operation instruction receiver 211, an operation controller 212, a memory 213, a first communication unit 214, a temperature sensor 215, an indoor fan motor 216, and a second communication unit 217.

The operation instruction receiver 211 receives an operation instruction from the remote control 3. The first communication unit 214 communicates with the control parameter changing assisting device 1 and the terminal device 5 via the adapter 4 and the network 6. The temperature sensor 215 detects the indoor temperature and the temperature within the refrigerant pipe. The operation controller 212 controls the operation of the air conditioner 2 in accordance with a control signal received from the control parameter changing assisting device 1. The memory 213 stores sensor data obtained by various sensors and various items of information such as a control signal received from the control parameter changing assisting device 1.

The indoor fan motor 216 drives the fan for taking in the indoor air and for discharging air cooled by a heat exchanger (not shown). The indoor fan motor 216 includes a rotational-speed measurer 2161 that measures the rotational speed of the indoor fan motor 216 per unit time. The second communication unit 217 communicates with the outdoor unit 22 and receives sensor data from the outdoor unit 22.

The control signal indicates a control parameter. The operation controller 212 calculates from the control parameter the rotational speed of the indoor fan motor 216 corresponding to the set temperature input from the remote control 3 and the indoor temperature detected by the temperature sensor 215.

The indoor unit 21 may include a power consumption measurer that measures power consumed in the air conditioner 2.

The outdoor unit 22 includes a third communication unit 221, a temperature sensor 222, a compressor 223, and an outdoor fan motor 224.

The third communication unit 221 communicates with the indoor unit 21. The third communication unit 221 sends sensor data to the indoor unit 21. The temperature sensor 222 detects the outdoor temperature. The compressor 223 sucks gas flowing through the refrigerant pipe, compresses the sucked gas, and discharges it. The compressor 223 includes a rotational-speed measurer 2231 that measures the rotational speed of the compressor 223 per unit time.

The outdoor fan motor 224 drives the fan for taking in the outdoor air and for cooling gas discharged from the compressor 223 by using a heat exchanger (not shown). The outdoor fan motor 224 includes a rotational-speed measurer 2241 that measures the rotational speed of the outdoor fan motor 224 per unit time.

Figure 4:
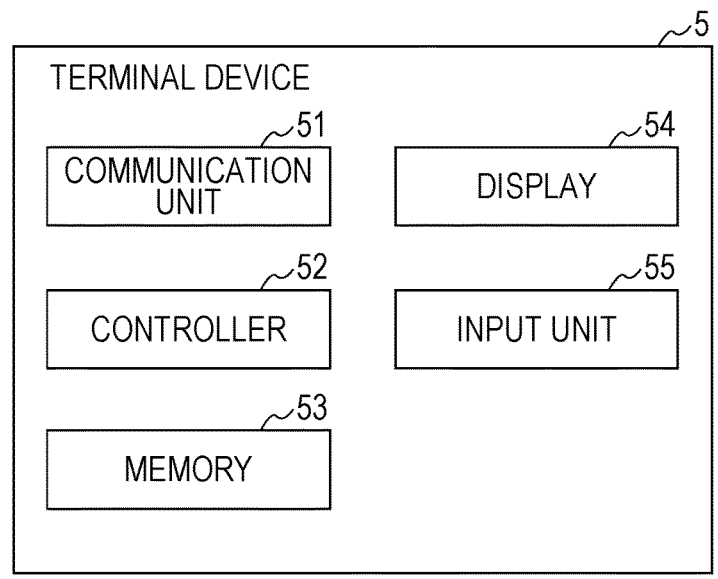
FIG. 4 is a block diagram illustrating an example of the configuration of a terminal device in the first embodiment.

FIG. 4 is a block diagram illustrating an example of the configuration of the terminal device 5 in the first embodiment. As shown in FIG. 4, the terminal device 5 includes a communication unit 51, a controller 52, a memory 53, a display 54, and an input unit 55.

The communication unit 51 communicates with the control parameter changing assisting device 1 via the network 6, and receives an operation mode selection image from the control parameter changing assisting device 1. The controller 52 controls the terminal device 5. The memory 53 stores various items of information. The display 54 displays the operation mode selection image received by the communication unit 51. The input unit 55 receives the operation mode selected by a user using the operation mode selection image displayed by the display 54. The communication unit 51 sends the selected operation mode received by the input unit 55 to the control parameter changing assisting device 1.

Data collection processing for collecting data from the air conditioner 2 by the control parameter changing assisting device 1 will be discussed below.

Figure 5:
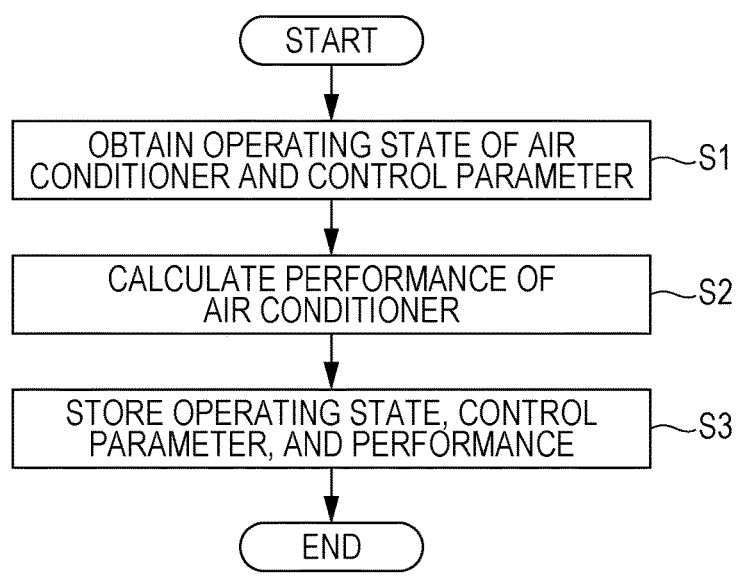
FIG. 5 is a flowchart illustrating data collection processing for collecting data from an air conditioner.

FIG. 5 is a flowchart illustrating data collection processing for collecting data from the air conditioner 2.

In step S1, the data collector 12 obtains the operating state of the air conditioner 2 and the control parameter from the air conditioner 2. As discussed above, the operating state indicates, for example, whether the air conditioner 2 is performing the cooling operation or the heating operation, or it is turned OFF, the set temperature of the air conditioner 2, and sensor data obtained by various sensors of the air conditioner 2.

Then, in step S2, the performance calculator 13 calculates the performance of the air conditioner 2, based on the operating state obtained by the data collector 12. As stated above, the performance of the air conditioner 2 is represented by a combination of the cooling capacity or the heating capacity and the power consumption of the air conditioner 2.

Then, in step S3, the performance calculator 13 stores the operating state and the control parameter obtained by the data collector 12 and the performance calculated by the performance calculator 13 in the storage unit 14.

The operating state, control parameter, and performance stored in the storage unit 14 will be discussed below.

FIG. 6 illustrates a table indicating examples of the operating state, control parameter, and performance stored in the storage unit 14. The air conditioner 2 supplies the model number and the product serial number of the air conditioner 2, together with the operating state and the control parameter. In the storage unit 14, the collection time of data, the model number and the product serial number of the air conditioner 2, the operating state (operating condition and sensor data), the control parameter, and the performance are stored in association with each other.

The control parameter number is a number for specifying the control parameter used by the air conditioner 2. For example, forty control parameters from No. 1 to No. 40 are provided according to the performance of the air conditioner 2. Each control parameter includes plural parameter tables according to the control fields of the control parameter. For example, the target rotational speed of the compressor and the target rotational speed of the indoor fan motor are determined in accordance with the set temperature and the indoor temperature.

In the first embodiment, the performance is represented by a combination of the cooling capacity or the heating capacity and the power consumption of the air conditioner 2. In the present disclosure, however, the performance may be represented by a combination of other factors. More specifically, the performance may be represented by a combination of two correlated values, for example, by a combination of the dehumidifying capacity, the humidifying capacity, or the air purifying capacity and the power consumption of the air conditioner 2.

Control parameter changing processing in the first embodiment will now be discussed below.

FIG. 7 is a flowchart illustrating control parameter changing processing in the first embodiment.

In step S101, the controller 52 of the terminal device 5 displays a menu image on the display 54 by starting an application installed in the terminal device 5, for example.

Figure 8:
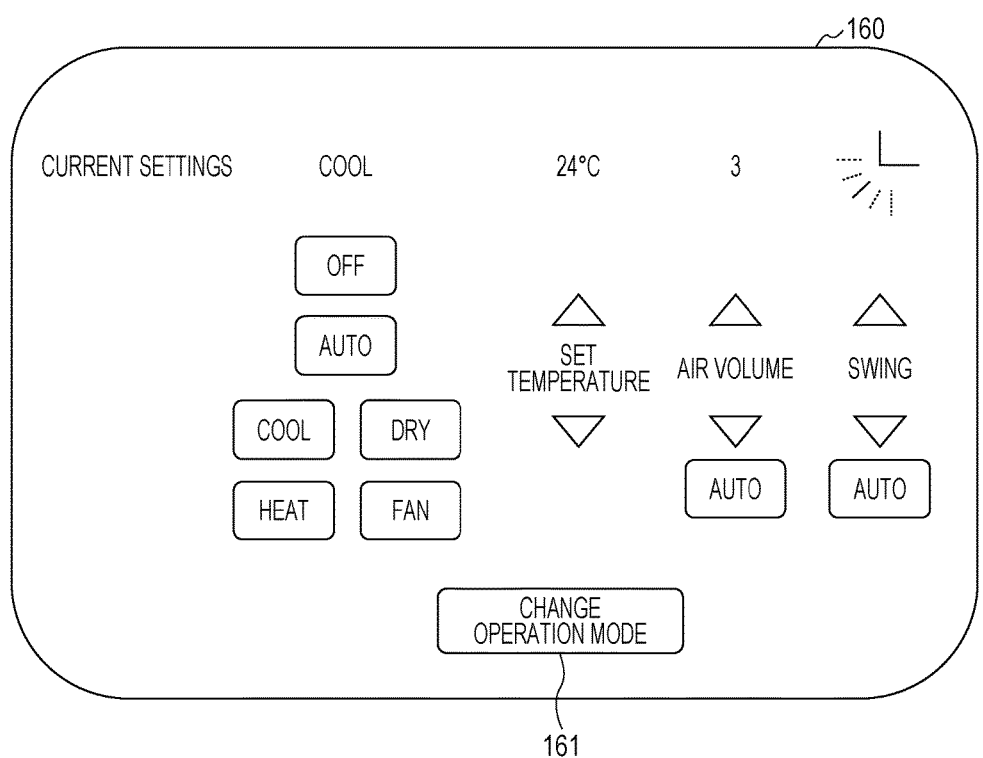
FIG. 8 illustrates an example of a menu image.

FIG. 8 illustrates an example of a menu image 160. As shown in FIG. 8, the menu image 160 includes various buttons for controlling the operation of the air conditioner 2. For example, the menu image 160 includes an operation mode change button 161 for changing the operation mode. The controller 52 displays the menu image 160 (first image) including the operation mode change button 161 (first interface) used for selecting whether to change the operation mode of the air conditioner 2.

Then, in step S102, the controller 52 determines whether the user has pressed the operation mode change button 161. If it is determined that the user has not pressed the operation mode change button 161 (NO in step S102), the controller 52 waits until the user presses the operation mode change button 161. If a button other than the operation mode change button 161 is pressed, the controller 52 controls the operation of the air conditioner 2 in accordance with the pressed button.

If it is determined in step S102 that the user has pressed the operation mode change button 161 (YES in step S102), the process proceeds to step S103. In step S103, the communication unit 51 sends an operation mode change request (first information) to change the operation mode to the control parameter changing assisting device 1.

Then, in step S104, the communication unit 11 of the control parameter changing assisting device 1 receives the operation mode change request from the terminal device 5.

Then, in step S105, the performance range calculator 15 of the control parameter changing assisting device 1 performs performance range calculating processing for calculating the range of the decreased performance of the air conditioner 2 that varies within a range in which the control parameter can be changed. Performance range calculating processing will be discussed below with reference to FIG. 9.

Figure 9:
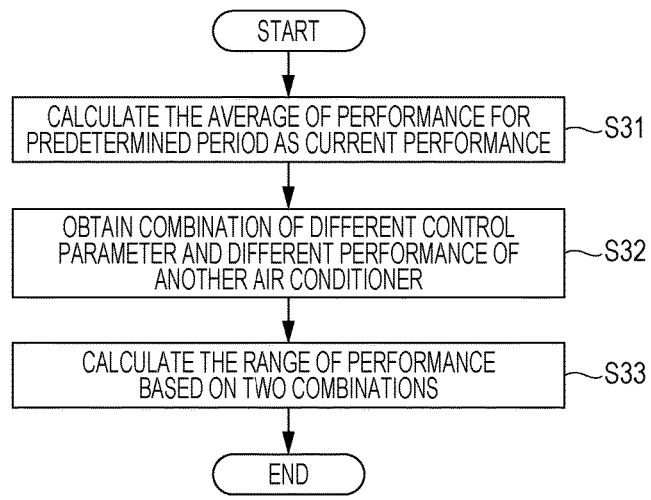
FIG. 9 is a flowchart illustrating performance range calculating processing in FIG. 7.

FIG. 9 is a flowchart illustrating performance range calculating processing in step S105 of FIG. 7.

In step S31, the performance range calculator 15 calculates the average of the performance of the air conditioner 2 for a predetermined period as the current performance. More specifically, the performance range calculator 15 calculates the average of the performance of the air conditioner 2 produced during the latest several hours as the current performance.

Then, in step S32, the performance range calculator 15 specifies a different air conditioner having the same model number as the air conditioner 2 and associated with the same combination as a first combination of the current performance and the current control parameter. The performance range calculator 15 then reads from the storage unit 14 a second combination of a control parameter different from the current control parameter and a different performance calculated by operating the specified different air conditioner with this different control parameter. That is, in the storage unit 14, a first combination of a first control parameter and a first performance produced by operating an air conditioner with the first control parameter and a second combination of a second control parameter different from the first control parameter and a second performance produced by operating the air conditioner with the second control parameter are stored in association with the model number and the product serial number of the air conditioner. The performance range calculator 15 thus calculates the range of the performance of the air conditioner 2 by utilizing a combination of a different control parameter and a different performance of another air conditioner connected to the control parameter changing assisting device 1 via the network 6.

Then, in step S33, the performance range calculator 15 calculates the range of the performance based on the two combinations.

Figure 10:
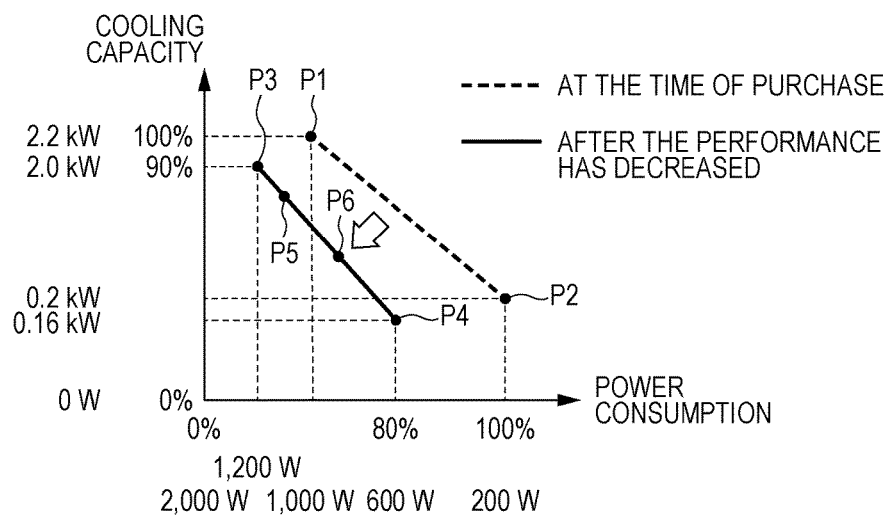
FIG. 10 is a graph illustrating the range of the performance of an air conditioner at the time of purchase and the range of the decreased performance of the air conditioner in the first embodiment.
Figure 11:
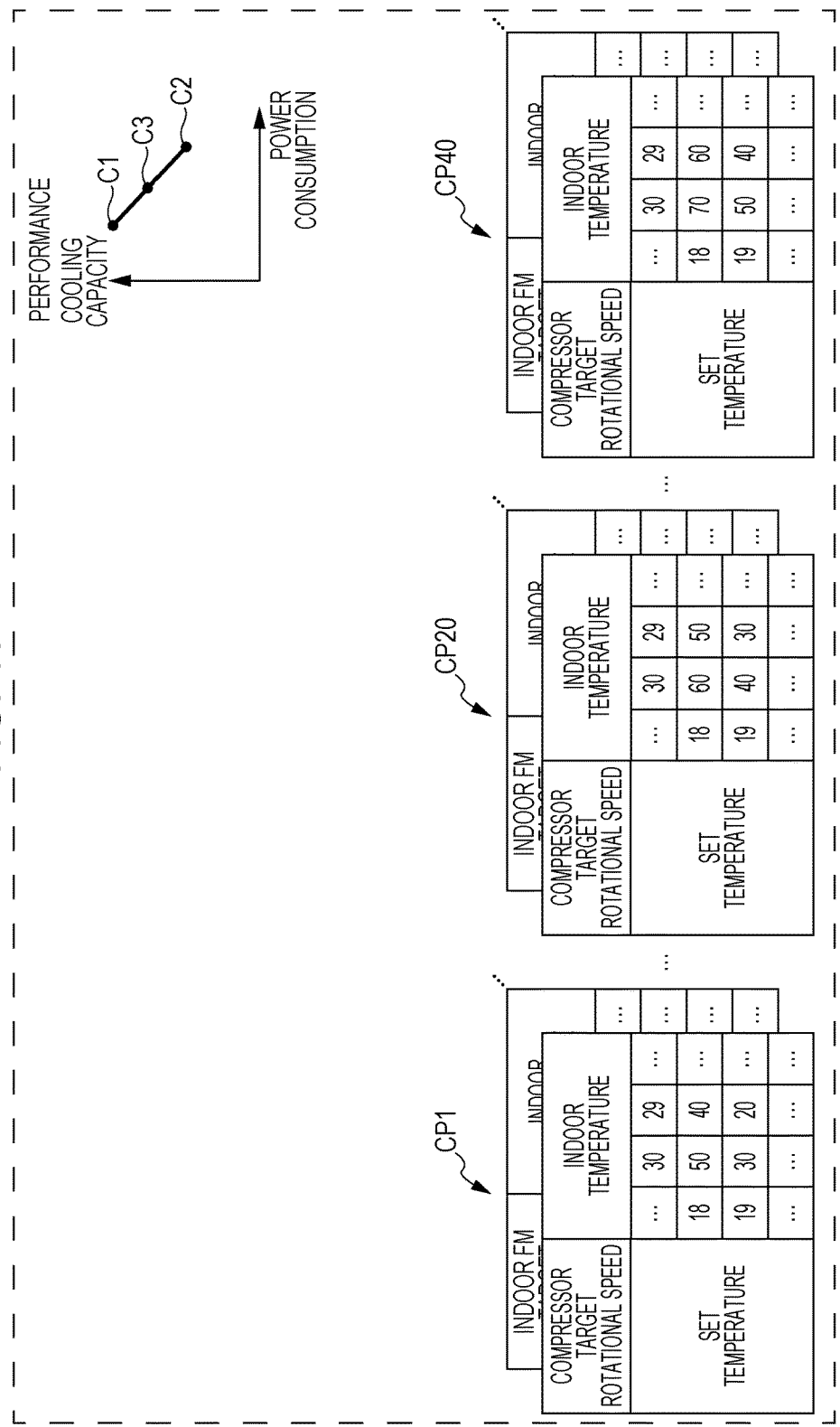
FIG. 11 shows diagrams for explaining control parameters in the first embodiment.

FIG. 10 is a graph illustrating the range of the performance of the air conditioner 2 at the time of purchase and the range of the decreased performance of the air conditioner 2 in the first embodiment. FIG. 11 shows diagrams for explaining control parameters in the first embodiment. FIG. 12 illustrates a table indicating an example of a first combination of a previous control parameter and the corresponding performance and an example of a second combination of a current control parameter and the corresponding performance.

As shown in FIG. 10, the performance of the air conditioner 2 is represented by a combination of the cooling capacity and the power consumption of the air conditioner 2. The power consumption is set on one coordinate axis (horizontal axis), while the cooling capacity is set on the other coordinate axis (vertical axis). On this coordinate system, the range of the performance is represented by a straight line connecting a coordinate point representing the power consumption and the cooling capacity obtained by operating the air conditioner 2 in the first operation mode and a coordinate point representing the power consumption and the cooling capacity obtained by operating the air conditioner 2 in the second operation mode. Although in FIG. 10 the range of the performance is represented by the relationship between the cooling capacity and the power consumption, it may similarly be represented by the relationship between the heating capacity and the power consumption.

In FIG. 10, the range of the performance of the air conditioner 2 at the time of purchase (or for some time after the purchase) is indicated by the dashed line, while the range of the decreased performance of the air conditioner 2 is indicated by the solid line.

Point P1 indicates the performance produced by operating the air conditioner 2 at the time of purchase by using a control parameter corresponding to the first operation mode (cooling-capacity priority). Point P2 indicates the performance produced by operating the air conditioner 2 at the time of purchase by using a control parameter corresponding to the second operation mode (power-consumption priority).

The maximum cooling capacity defined in the air conditioner 2 is 2.2 kW, while the maximum power consumption defined in the air conditioner 2 is 2000 W. The cooling capacity at point P1 is 2.2 kW, while the cooling capacity at the origin is 0 kW. The power consumption at point P2 is 200 W, while the power consumption at the origin is 2000 W. In the first embodiment, the values of the maximum cooling capacity and the maximum power consumption of the air conditioner 2 are only examples, and may be defined according to the model number.

Point P3 indicates the decreased performance produced by operating the air conditioner 2 with a control parameter corresponding to the first operation mode (cooling-capacity priority). Point P4 indicates the decreased performance produced by operating the air conditioner 2 with a control parameter corresponding to the second operation mode (power-consumption priority).

The operation mode can be selected in a stepwise manner within a range between the first operation mode and the second operation mode. For example, if the first operation mode is selected, the control parameter determining unit 17 selects a first control parameter CP1 shown in FIG. 11 corresponding to the first operation mode as the control parameter. If the second operation mode is selected, the control parameter determining unit 17 selects a fortieth control parameter CP40 shown in FIG. 11 corresponding to the second operation mode as the control parameter. As shown in FIG. 11, forty control parameters from the first control parameter CP1 to the fortieth control parameter CP40 are provided. Each control parameter includes plural parameter tables according to the control fields of the control parameter. The value of each control field is determined based on the set temperature and the current indoor temperature. In the first control parameter CP1, for example, if the set temperature is 18 degrees and the current indoor temperature is 30 degrees, the target rotational speed of the compressor is 50.

The performance produced by operating the air conditioner 2 with the first control parameter CP1 is indicated by point C1 in FIG. 11, while the performance produced by operating the air conditioner 2 with the fortieth control parameter CP40 is indicated by point C2 in FIG. 11. The performance produced by operating the air conditioner 2 with the twentieth control parameter CP20, which is an intermediate value between the first control parameter CP1 and the fortieth control parameter CP40, is indicated by point C3 in FIG. 11.

In the first embodiment, forty control parameters from the first control parameter CP1 to the fortieth control parameter CP40 are used. In the present disclosure, however, the number of control parameters is not restricted, and more than forty control parameters or less than forty control parameters may be used.

Performance range calculating processing will be described below.

The performance range calculator 15 calculates the average of the performance of the air conditioner 2 produced during the latest several hours as the current performance. For example, point P5 shown in FIG. 10 indicates the current performance calculated by the performance range calculator 15.

Then, the performance range calculator 15 specifies a different air conditioner having the same model number as the air conditioner 2 and associated with the same combination as a first combination of the current performance and the current control parameter. The performance range calculator 15 then reads from the storage unit 14 a second combination of a control parameter different from the current control parameter and a different performance calculated by operating the specified different air conditioner with this different control parameter. For example, point P6 indicates the different performance calculated by operating the specified different air conditioner with this different control parameter.

The model number of the different air conditioner is not necessarily the same as that of the subject air conditioner (air conditioner 2). The performance range calculator 15 may specify a different air conditioner associated with the same combination as a first combination of the current performance and the current control parameter. The performance range calculator 15 may then read from the storage unit 14 a second combination of a control parameter different from the current control parameter and a different performance calculated by operating the specified different air conditioner with this different control parameter.

As shown in FIG. 12, a first combination of the ID number for identifying a first control parameter and a first performance produced by operating a subject air conditioner with the first control parameter and a second combination of the ID number for identifying a second control parameter different from the first control parameter and a second performance produced by operating the subject air conditioner with the second control parameter are stored in the storage unit 14 in association with the model number and the product serial number of the air conditioner.

For example, regarding the air conditioner with the model number "AC-001" and the product serial number "3456" for which the control parameter is changed at 12:05 on Jun. 5, 2015, a first combination of the control parameter ID number "4", the cooling capacity of "2.0", and the power consumption of "190" and a second combination of the control parameter ID number "9", the cooling capacity of "1.7", and the power consumption of "130" are associated with this air conditioner.

Then, the performance range calculator 15 calculates the range of the performance, based on a straight line connecting point P5 indicating the current performance and point P6 indicating a different performance shown in FIG. 10. The performance range calculator 15 calculates the range of the performance by determining a straight line passing through point P5 and point P6 and by determining the end points of the straight line. Point P3 at one end of the straight line and point P4 at the other end of the straight line can be calculated from the ID number of the control parameter at point P5 and the ID number of the control parameter at point P6. That is, the control parameter for the subject air conditioner at the time of purchase is the same as that for the air conditioner with the decreased performance. The control parameter at point P1 is the same as that at point P3, while the control parameter at point P2 is the same as that at point P4. The number of control parameters is fixed, and the control parameters are associated with positions at regular intervals within the operation mode selection range for the decreased performance. Thus, if the ID number of the control parameter at point P5, the ID number of the control parameter at point P6, and the distance between point P5 and point P6 are known, the positions of point P3 and point P4 can be calculated.

If the calculated range of the decreased performance is outside the upper limit value or the lower limit value, the performance range calculator 15 may adjust the range of the decreased performance so that the performance will be equal to or lower than the upper limit value or equal to or higher than the lower limit value. In FIG. 10, for example, if the lower limit value of the cooling capacity is 0.2 kW, the cooling capacity at point P4 is 0.16 kW and exceeds the lower limit value. In this case, the performance range calculator 15 may adjust the range of the decreased performance so that the cooling capacity will be 0.2 kW or higher.

The range of the performance of the air conditioner 2 is calculated as described above.

Referring back to FIG. 7, in step S106, the operation mode range determining unit 16 converts the range of the performance calculated by the performance range calculator 15 into an operation mode selection range for the decreased performance of the air conditioner 2. In FIG. 10, for example, the cooling capacity produced by operating the air conditioner 2 in the first operation mode after the performance has decreased is reduced to 90% of that by the air conditioner 2 at the time of purchase in the first operation mode. The operation mode range determining unit 16 thus reduces the length for the first operation mode within the operation mode selection range for the decreased performance to 90%. In FIG. 10, the power consumption produced by operating the air conditioner 2 in the second operation mode after the performance has decreased is reduced to 80% of that by the air conditioner 2 at the time of purchase in the second operation mode. The operation mode range determining unit 16 thus reduces the length for the second operation mode within the operation mode selection range for the decreased performance to 80%.

Then, in step S107, the operation mode range determining unit 16 reads the range of the initial performance of the air conditioner 2 stored in the storage unit 14, and converts the range of the initial performance into an operation mode selection range for the initial performance. The storage unit 14 stores the range of the initial performance of the air conditioner 2 at the time of purchase. The range of the initial performance is represented by, for example, a straight line connecting point P1 and point P2 in FIG. 10. The range of the initial performance may be stored in the storage unit 14 at the time of manufacturing of the air conditioner 2 or may be calculated when the air conditioner 2 is operated for the first time. The range of the initial performance may be obtained from another air conditioner via the network 6 or from another server via the network 6.

Then, in step S108, the operation mode range determining unit 16 generates an operation mode selection image indicating the operation mode selection range for the decreased performance. The operation mode selection image includes the operation mode selection range for the initial performance and the operation mode selection range for the decreased performance.

Then, in step S109, the communication unit 11 sends the operation mode selection image generated by the operation mode range determining unit 16 to the terminal device 5.

Then, in step S110, the communication unit 51 of the terminal device 5 receives the operation mode selection image from the control parameter changing assisting device 1.

Then, in step S111, the display 54 displays the operation mode selection image received by the communication unit 51.

Then, in step S112, the input unit 55 receives the operation mode selected by a user using the operation mode selection image displayed by the display 54. In this case, the user selects a desired position on the operation mode selection image.

The operation mode selection image will be discussed below.

Figure 13:
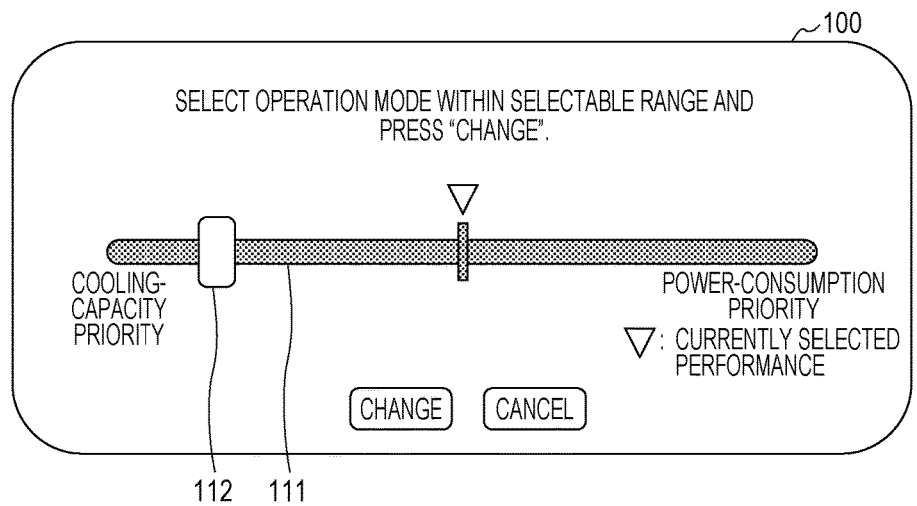
FIG. 13 illustrates an example of an operation mode selection image displayed at the time of purchase of an air conditioner in the first embodiment.
Figure 14:
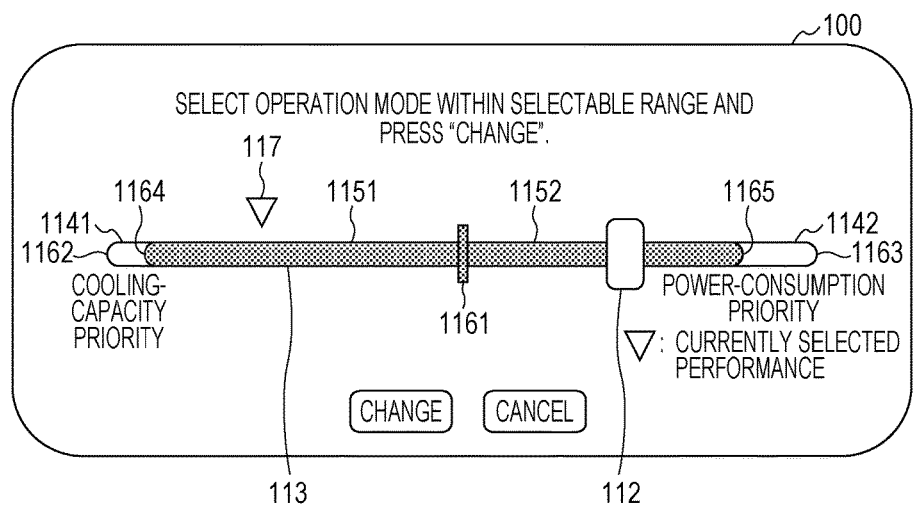
FIG. 14 illustrates an example of an operation mode selection image displayed after the performance of an air conditioner has decreased in the first embodiment.

FIG. 13 illustrates an example of an operation mode selection image 111 displayed at the time of purchase of the air conditioner 2. FIG. 14 illustrates an example of an operation mode selection image 113 displayed after the performance of the air conditioner 2 has decreased.

As shown in FIG. 13, the operation mode selection image 111 is displayed on a screen 100 of the display 54. The operation mode selection image 111 is formed in a bar-like shape at one end at which the first operation mode is selected and at the other end at which the second operation mode is selected. The left end of the operation mode selection image 111 corresponds to the first operation mode (cooling-capacity priority), while the right end of the operation mode selection image 111 corresponds to the second operation mode (power-consumption priority). The user selects a desired operation mode by horizontally shifting an adjustment knob image 112 displayed on the operation mode selection image 111.

As shown in FIG. 14, the operation mode selection image 113 (second image) represents (i) a first selection range 1141 indicating the magnitude range of the first operation mode at the time of purchase of the air conditioner 2, (ii) a second selection range 1151 contained within the first selection range 1141 and indicating the current magnitude range of the first operation mode of the air conditioner 2, (iii) a third selection range 1142 indicating the magnitude range of the second operation mode at the time of purchase of the air conditioner 2, and (iv) a fourth selection range 1152 contained within the third selection range 1142 and indicating the current magnitude range of the second operation mode of the air conditioner 2.

The operation mode selection image 113 displayed after the performance of the air conditioner 2 has decreased includes the first and third selection ranges 1141 and 1142 converted from the range of the initial performance and the second and fourth selection ranges 1151 and 1152 converted from the range of the decreased performance. The second and fourth selection ranges 1151 and 1152, which reflect the range of the decreased performance, are shorter than the first and third selection ranges 1141 and 1142. On the screen 100 of the display 54, the second and fourth selection ranges 1151 and 1152 are respectively superposed on the first and third selection ranges 1141 and 1142 and are respectively distinguished from the first and third selection ranges 1141 and 1142. For example, the second and fourth selection ranges 1151 and 1152 may be displayed in a color different from the first and third selection ranges 1141 and 1142.

The relationship between the length of the first selection range 1141 and that of the second selection range 1151 represents a degree of decrease in the performance of the air conditioner 2 over the period from the time of purchase to the current time. The relationship between the length of the third selection range 1142 and that of the fourth selection range 1152 represents a degree of decrease in the performance of the air conditioner 2 over the period from the time of purchase to the current time. The operation mode selection image 113 includes the adjustment knob image 112 (second interface) used by the user to select one point on one of the second and fourth selection ranges 1151 and 1152.

The operation mode selection image 113 is formed in a bar-like shape. The range from a first reference point 1161 between one end 1162 and the other end 1163 of the operation mode selection image 113 to the end 1162 corresponds to the first selection range 1141, the range from the first reference point 1161 to the end 1163 corresponds to the third selection range 1142, the range from the first reference point 1161 to a second reference point 1164 within the first selection range 1141 corresponds to the second selection range 1151, and the range from the first reference point 1161 to a third reference point 1165 within the third selection range 1142 corresponds to the fourth selection range 1152.

The adjustment knob image 112 (second interface) is slidable from the second reference point 1164 to the third reference point 1165 by the user.

The operation mode selection image 113 may include a mark 117 indicating the previous operation mode and the magnitude thereof.

In the first embodiment, the shape of the operation mode selection image 113 is not restricted to a bar, and may be a semi-circle or a circle. One end of the semi-circular circumference corresponds to the first operation mode (cooling-capacity priority), while the other end on the semi-circular circumference corresponds to the second operation mode (power-consumption priority). In this case, the user may select the operation mode by shifting along the circumference the position of the arrow extending from the center of the semi-circle or the circle in the radial direction.

Referring back to FIG. 7, in step S113, the input unit 55 determines whether the user has input the operation mode. If it is determined that the user has not input the operation mode (NO in step S113), the input unit 55 waits until the user inputs the operation mode. If the user has pressed a cancel button instead of inputting the operation mode, the processing is terminated.

If it is determined in step S113 that the user has input the operation mode (YES in step S113), the process proceeds to step S114. In step S114, the communication unit 51 sends information indicating the input operation mode to the control parameter changing assisting device 1. Information indicating the operation mode may be a position on the operation mode selection image selected by the user.

Then, in step S115, the communication unit 11 of the control parameter changing assisting device 1 receives information indicating the operation mode from the terminal device 5. The communication unit 11 receives from the terminal device 5 information (second information) indicating the current operation mode and the magnitude thereof represented by one point selected by the user using the adjustment knob image 112 (second interface).

Then, in step S116, the control parameter determining unit 17 determines a control parameter based on the information indicating the operation mode received by the communication unit 11. For example, the control parameter determining unit 17 determines a control parameter corresponding to the position on the operation mode selection image selected by the user. The control parameter determining unit 17 obtains information (fourth information) indicating the association between individual points of the second selection range 1151 and parameter sets for operating the air conditioner 2 and the association between individual points of the fourth selection range 1152 and parameter sets for operating the air conditioner 2. The control parameter determining unit 17 selects a parameter set for operating the air conditioner 2, based on the second information and the fourth information. The parameter set indicates the target rotational speed of the compressor and that of the fan motor of the air conditioner 2.

Then, in step S117, the communication unit 11 sends the control parameter determined by the control parameter determining unit 17 to the air conditioner 2. The communication unit 11 sends a command (control parameter) for controlling the air conditioner 2 by using the current operation mode and the magnitude thereof to the air conditioner 2. The first communication unit 214 of the air conditioner 2 receives the control parameter from the control parameter changing assisting device 1. The operation controller 212 controls the operation of the air conditioner 2 by using the control parameter received by the first communication unit 214.

Then, in step S118, the communication unit 11 sends a message that the operation mode has changed to the terminal device 5.

Then, in step S119, the communication unit 51 of the terminal device 5 receives this message from the control parameter changing assisting device 1.

Then, in step S120, the controller 52 displays an operation mode change notifying image for notifying the user of a change in the operation mode on the display 54.

Figure 15:
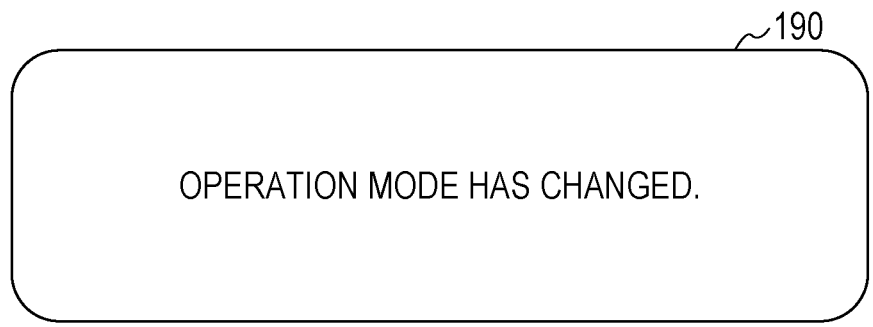
FIG. 15 illustrates an example of an operation mode change notifying image.

FIG. 15 illustrates an example of an operation mode change notifying image 190 displayed on the display 54. This enables the user to recognize that the operation mode has changed.

Referring back to FIG. 7, in step S121, the performance calculator 13 calculates the average of the performance of the air conditioner 2 for a predetermined period after the operation mode has changed, and sets the calculated average as the performance of the air conditioner 2 after a change in the operation mode. That is, the performance calculator 13 calculates the average of the performance of the air conditioner 2 produced for a predetermined period from the time of a change in the operation mode to the current time, and sets the calculated average as the performance of the air conditioner 2 after a change in the operation mode. If the control parameter for the air conditioner 2 is changed from the first control parameter to the second control parameter, the data collector 12 obtains the second control parameter and the operating state of the air conditioner 2 operated with the second control parameter. The performance calculator 13 calculates the second performance of the air conditioner 2 based on the obtained operating state.

Then, in step S122, the performance calculator 13 stores the first combination of the first control parameter and the first performance prior to a change in the operation mode and the second combination of the second control parameter and the second performance subsequent to a change in the operation mode in the storage unit 14 in association with the air conditioner 2. In this case, the time of a change in the operation mode, information for identifying the air conditioner 2, and the first and second combinations are stored in association with each other in the storage unit 14, as shown in FIG. 12.

As described above, the operation mode selection image indicating the range of the operation mode that is selectable by the user becomes smaller in accordance with a decrease in the performance of the air conditioner 2. This enables the user to visually check how much the performance of the air conditioner 2 has decreased.

First Modified Example

In the first embodiment, pressing of the operation mode change button 161 displayed on the menu image 160 triggers the execution of control parameter changing processing. In the present disclosure, however, the execution of control parameter changing processing may start when the performance of the air conditioner 2 has decreased to a level lower than a predetermined value.

Figure 16:
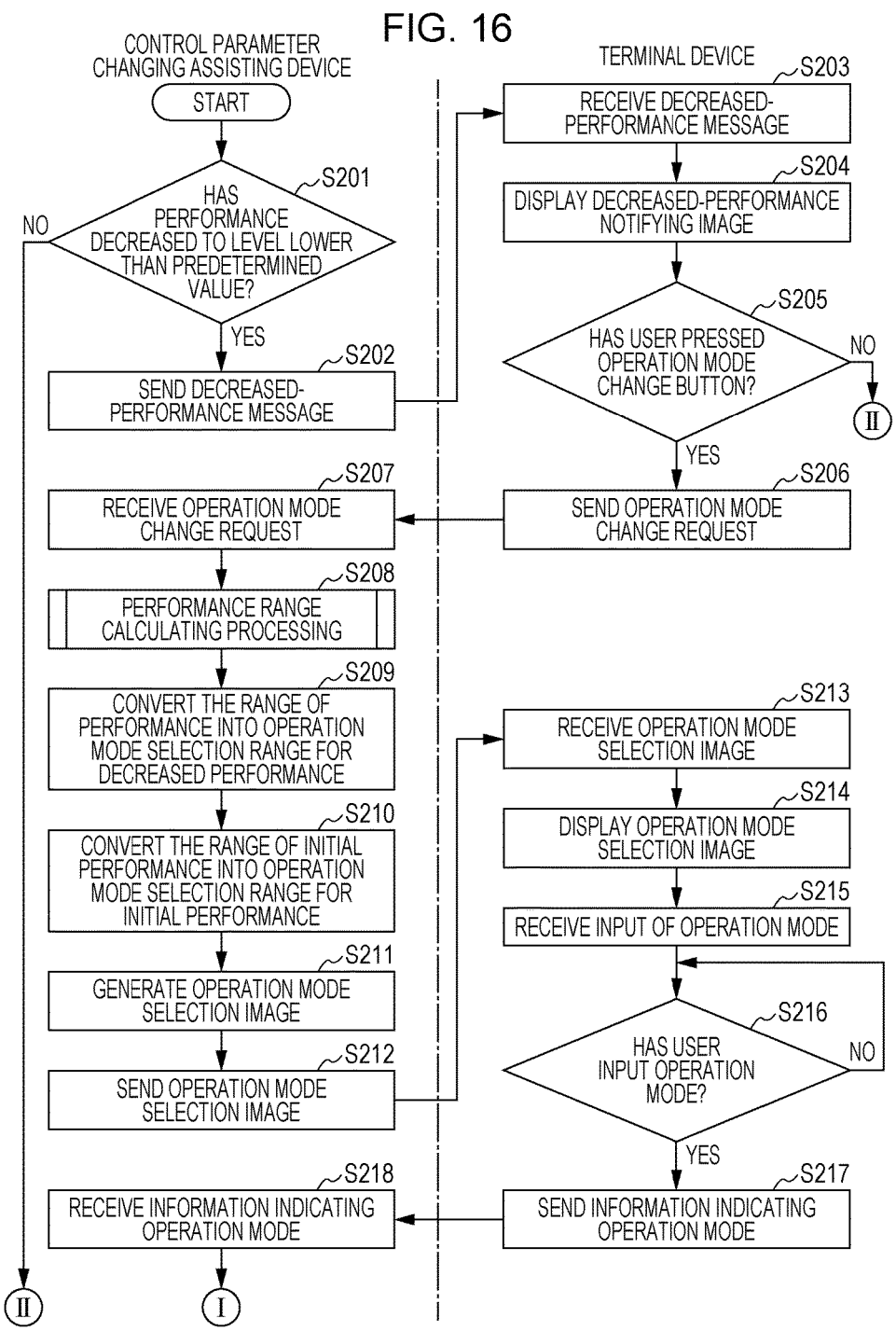
FIGS. 16 and 17 are first and second flowcharts, respectively, illustrating control parameter changing processing in a first modified example of the first embodiment.
Figure 17:
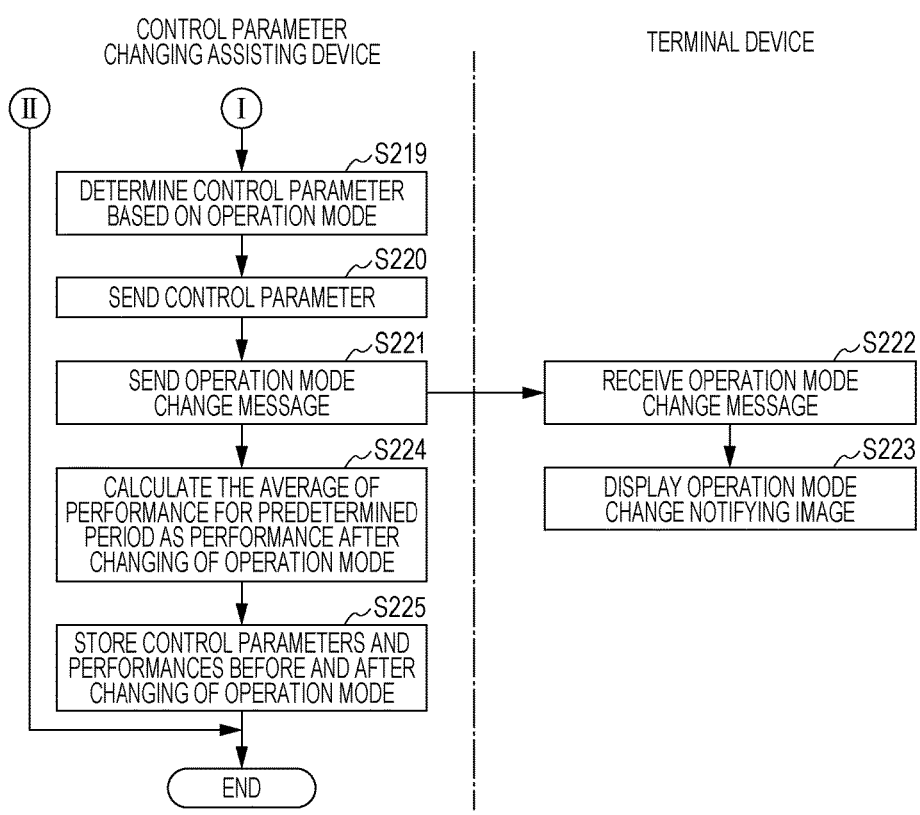

FIGS. 16 and 17 are first and second flowcharts, respectively, illustrating control parameter changing processing in a first modified example of the first embodiment.

In step S201, the performance calculator 13 of the control parameter changing assisting device 1 determines whether the performance of the air conditioner 2 stored in the storage unit 14 has decreased to a level lower than a predetermined value. More specifically, the performance calculator 13 determines whether the cooling capacity or the heating capacity of the air conditioner 2 has decreased to a level lower than a predetermined value and whether the power consumption performance of the air conditioner 2 has decreased to a level lower than a predetermined value. If it is determined that at least one of the power consumption performance and the cooling capacity or the heating capacity has decreased to a level lower than the corresponding predetermined value, the performance calculator 13 determines that the performance of the air conditioner 2 has decreased to a level lower than the predetermined value. If it is determined that the performance of the air conditioner 2 has not decreased to a level lower than the predetermined value (NO in step S201), control parameter changing processing is terminated.

If it is determined that the performance of the air conditioner 2 has decreased to a level lower than the predetermined value (YES in step S201), the process proceeds to step S202. In step S202, the communication unit 11 sends a message that the performance of the air conditioner 2 has decreased to the terminal device 5.

Then, in step S203, the communication unit 51 of the terminal device 5 receives this message from the control parameter changing assisting device 1.

Then, in step S204, the controller 52 displays on the display 54 a decreased-performance notifying image for notifying the user of a decrease in the performance of the air conditioner 2 and for receiving an instruction regarding whether to change the operation mode.

Figure 18:
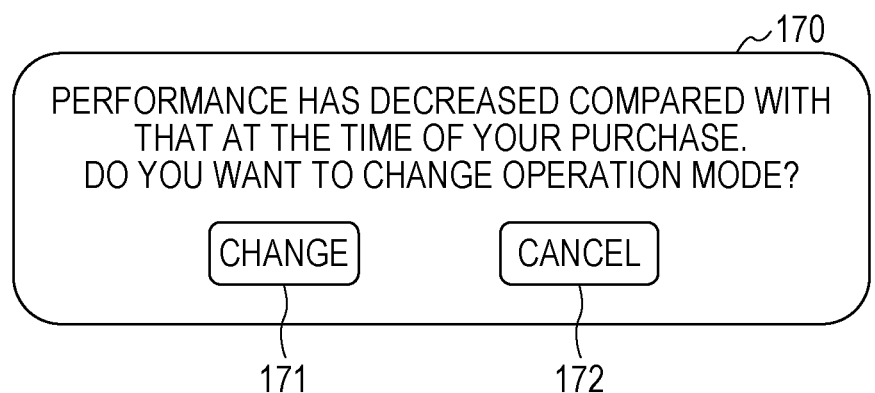
FIG. 18 illustrates an example of a decreased-performance notifying image.

FIG. 18 illustrates an example of a decreased-performance notifying image 170. As shown in FIG. 18, the decreased-performance notifying image 170 includes a message that the performance of the air conditioner 2 has decreased. The decreased-performance notifying image 170 also includes an operation mode change button 171 for selecting to change the operation mode and a cancel button 172 for selecting not to change the operation mode. The controller 52 displays the decreased-performance notifying image 170 (first image) including the operation mode change button 171 (first interface) used for selecting whether to change the operation mode of the air conditioner 2.

Then, in step S205, the controller 52 determines whether the user has pressed the operation mode change button 171. If it is determined that the user has not pressed the operation mode change button 171 (NO in step S205), that is, that the user has pressed the cancel button 172, control parameter changing processing is terminated.

If it is determined in step S205 that the user has pressed the operation mode change button 171 (YES in step S205), the process proceeds to step S206. In step S206, the communication unit 51 sends an operation mode change request to change the operation mode to the control parameter changing assisting device 1.

Then, in step S207, the communication unit 11 of the control parameter changing assisting device 1 receives the operation mode change request from the terminal device 5.

Steps S208 through S225 are similar to steps S105 through S122 in FIG. 7, and an explanation thereof will thus be omitted.

Second Modified Example

In the first embodiment, pressing of the operation mode change button 161 displayed on the menu image 160 triggers the execution of control parameter changing processing. In the present disclosure, however, the elapse of a predetermined time after the operation mode has previously changed may trigger the execution of control parameter changing processing.

Figure 19:
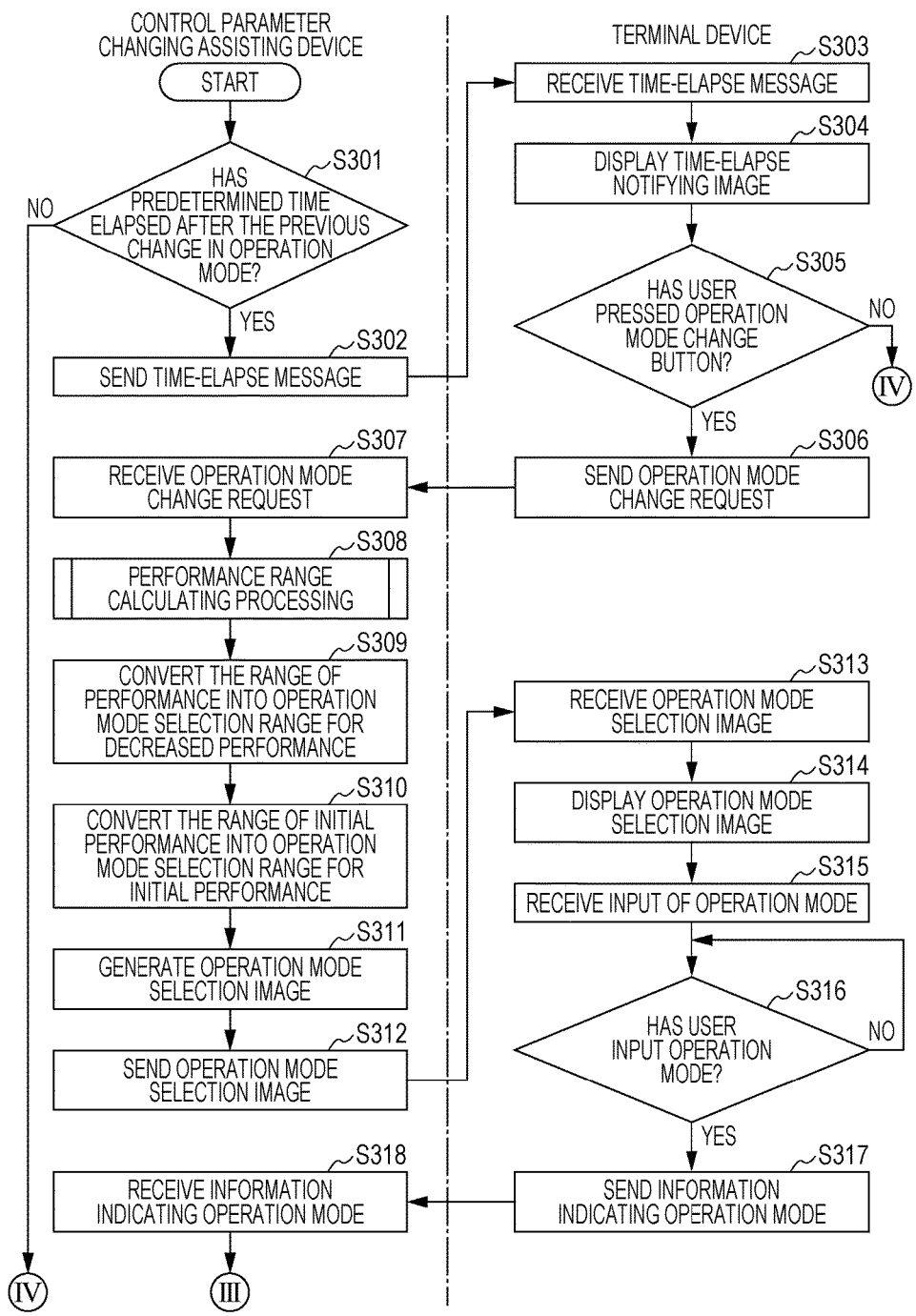
FIGS. 19 and 20 are first and second flowcharts, respectively, illustrating control parameter changing processing in a second modified example of the first embodiment.
Figure 20:
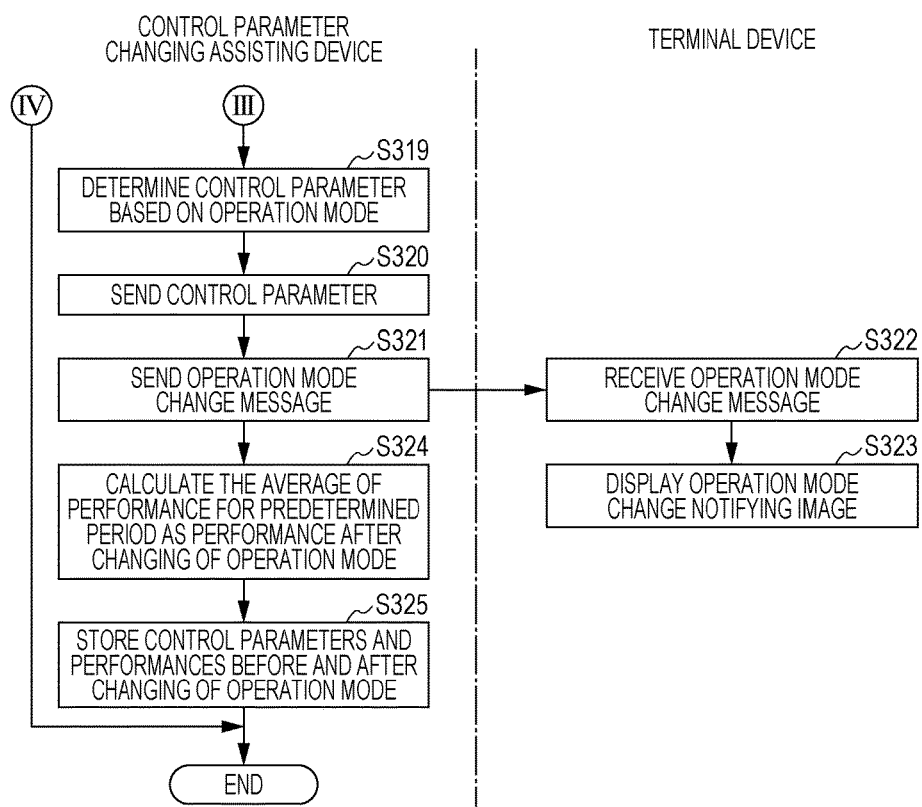

FIGS. 19 and 20 are first and second flowcharts, respectively, illustrating control parameter changing processing in a second modified example of the first embodiment.

In step S301, the performance calculator 13 of the control parameter changing assisting device 1 determines whether a predetermined time has elapsed after the previous change in the operation mode. In the storage unit 14, the time and date at which the operation mode is changed is stored. The communication unit 11 receives information (third information) indicating that the air conditioner 2 is powered ON from the air conditioner 2. The performance calculator 13 determines whether the period from the time at which the operation mode has previously changed to the time at which the third information is received exceeds a predetermined period. The performance calculator 13 determines whether one year, for example, has elapsed after the previous change in the operation mode.

If the operation mode has never been changed, that is, if the operation mode is changed for the first time, the control parameter changing assisting device 1 may receive an instruction to change the operation mode by causing the terminal device 5 to display the menu image 160, as shown in FIG. 7, or by determining whether the performance has decreased, as shown in FIG. 16. When the operation mode is changed for the first time, the control parameter changing assisting device 1 may also determine whether a predetermined time has elapsed after the air conditioner 2 has operated for the first time.

If it is determined that a predetermined time has not elapsed after the previous change in the operation mode (NO in step S301), control parameter changing processing is terminated.

If it is determined that a predetermined time has elapsed after the previous change in the operation mode (YES in step S301), the process proceeds to step S302. In step S302, the communication unit 11 sends a message that a predetermined time has elapsed after the previous change in the operation mode to the terminal device 5.

Then, in step S303, the communication unit 51 of the terminal device 5 receives this message from the control parameter changing assisting device 1.

Then, in step S304, the controller 52 displays on the display 54 a time-elapse notifying image for notifying the user of the lapse of a predetermined time after the previous change in the operation mode and for receiving an instruction regarding whether to change the operation mode. In this manner, the control parameter changing assisting device 1 causes the terminal device 5 to display a time-elapse notifying image (first image) if an elapsed time exceeds a predetermined period.

Figure 21:
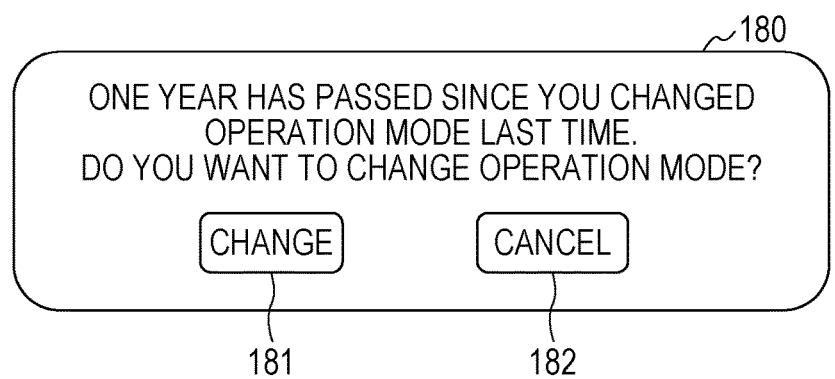
FIG. 21 illustrates an example of a time-elapse notifying image.

FIG. 21 illustrates an example of a time-elapse notifying image 180. As shown in FIG. 21, the time-elapse notifying image 180 includes a message that a predetermined time has elapsed after the previous change in the operation mode. The time-elapse notifying image 180 includes an operation mode change button 181 for selecting to change the operation mode and a cancel button 182 for selecting not to change the operation mode. The controller 52 displays the time-elapse notifying image 180 (first image) including the operation mode change button 181 (first interface) used for selecting whether to change the operation mode of the air conditioner 2.

Then, in step S305, the controller 52 determines whether the user has pressed the operation mode change button 181. If it is determined that the user has not pressed the operation mode change button 181 (NO in step S305), that is, that the user has pressed the cancel button 182, control parameter changing processing is terminated.

If it is determined in step S305 that the user has pressed the operation mode change button 181 (YES in step S305), the process proceeds to step S306. In step S306, the communication unit 51 sends an operation mode change request to change the operation mode to the control parameter changing assisting device 1.

Then, in step S307, the communication unit 11 of the control parameter changing assisting device 1 receives the operation mode change request from the terminal device 5.

Steps S308 through S325 are similar to steps S105 through S122 in FIG. 7, and an explanation thereof will thus be omitted.

Third Modified Example

In the first embodiment, the operation mode selection image is formed in a bar-like shape, as shown in FIGS. 13 and 14. In the present disclosure, however, the operation mode selection image is not restricted to this shape, and may be formed in an arc-like shape.

Figure 22:
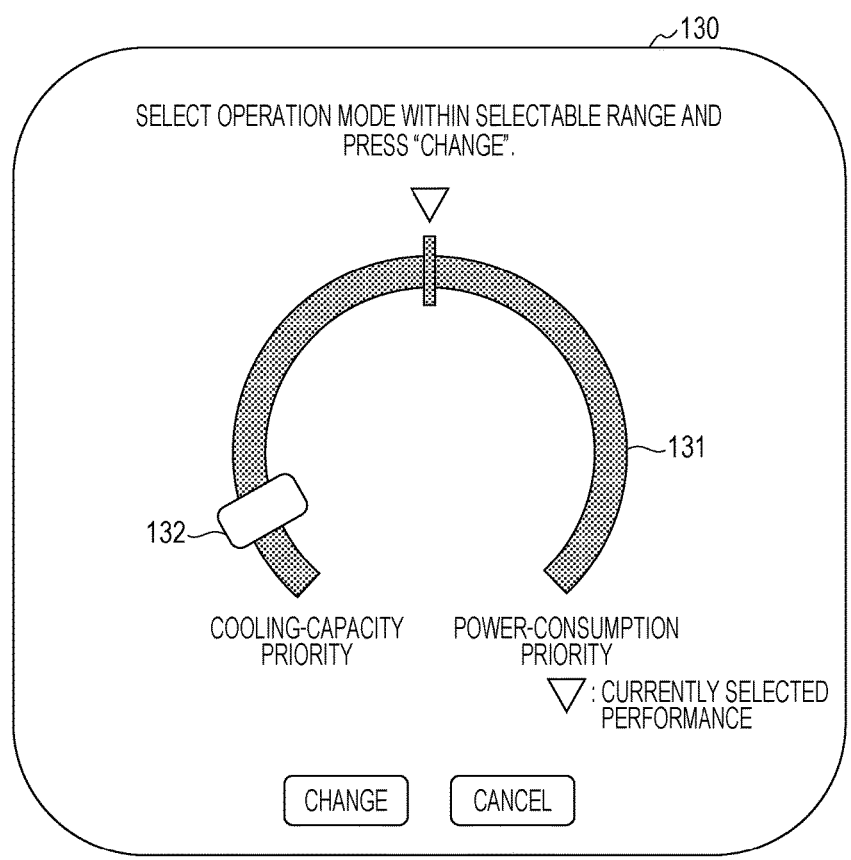
FIG. 22 illustrates an example of an operation mode selection image displayed at the time of purchase of an air conditioner in a third modified example of the first embodiment.
Figure 23:
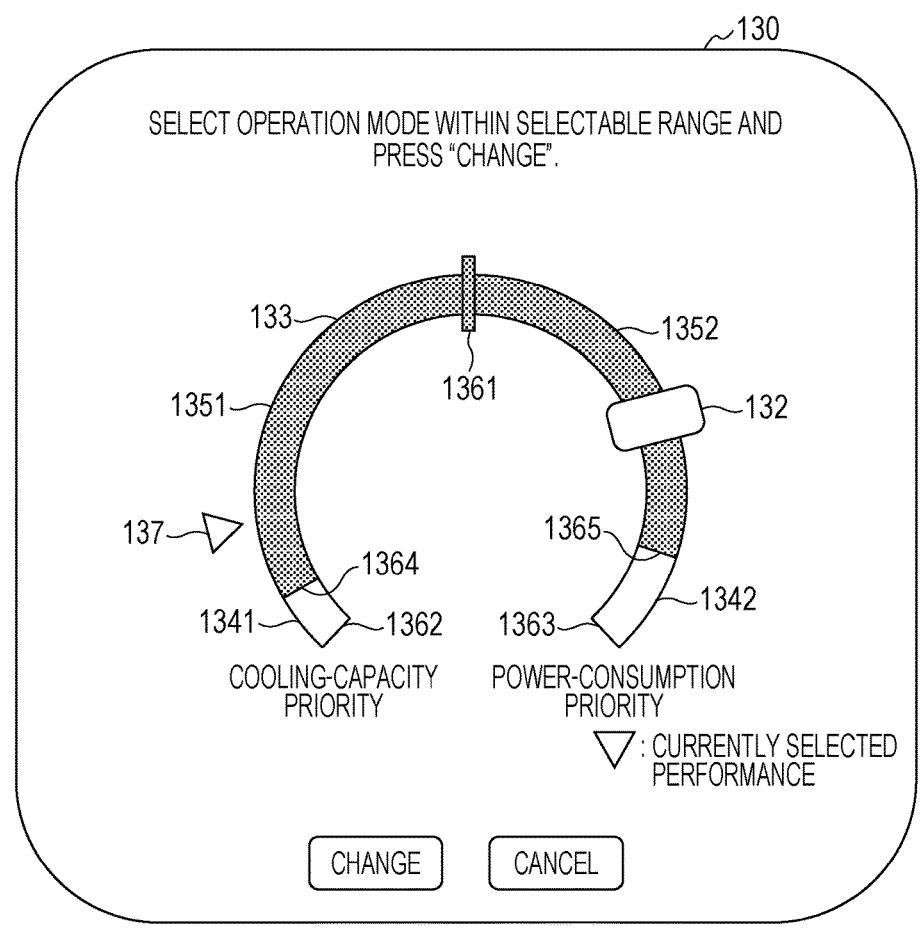
FIG. 23 illustrates an example of an operation mode selection image displayed after the performance of an air conditioner has decreased in the third modified example of the first embodiment.

FIG. 22 illustrates an example of an operation mode selection image 131 displayed at the time of purchase of the air conditioner 2 in a third modified example of the first embodiment. FIG. 23 illustrates an example of an operation mode selection image 133 displayed after the performance of the air conditioner 2 has decreased in the third modified example of the first embodiment.

As shown in FIG. 22, the operation mode selection image 131 is displayed on a screen 130 of the display 54. The operation mode selection image 131 is formed in an arc-like shape at one end at which the first operation mode is selected and at the other end at which the second operation mode is selected. The left end of the operation mode selection image 131 corresponds to the first operation mode (cooling-capacity priority), while the right end of the operation mode selection image 131 corresponds to the second operation mode (power-consumption priority). The user selects a desired operation mode by shifting along the circumference an adjustment knob image 132 displayed on the operation mode selection image 131.

As shown in FIG. 23, the operation mode selection image 133 (second image) represents (i) a first selection range 1341 indicating the magnitude range of the first operation mode at the time of purchase of the air conditioner 2, (ii) a second selection range 1351 contained within the first selection range 1341 and indicating the current magnitude range of the first operation mode of the air conditioner 2, (iii) a third selection range 1342 indicating the magnitude range of the second operation mode at the time of purchase of the air conditioner 2, and (iv) a fourth selection range 1352 contained within the third selection range 1342 and indicating the current magnitude range of the second operation mode of the air conditioner 2.

The relationship between the length of the first selection range 1341 and that of the second selection range 1351 represents a degree of decrease in the performance of the air conditioner 2 over the period from the time of purchase to the current time. The relationship between the length of the third selection range 1342 and that of the fourth selection range 1352 represents a degree of decrease in the performance of the air conditioner 2 over the period from the time of purchase to the current time. The operation mode selection image 133 includes the adjustment knob image 132 (second interface) used by the user to select one point on the second and fourth selection ranges 1351 and 1352.

The operation mode selection image 133 is formed in an arc-like shape. The range from a first reference point 1361 between one end 1362 and the other end 1363 of the operation mode selection image 133 to the end 1362 corresponds to the first selection range 1341, the range from the first reference point 1361 to the end 1363 corresponds to the third selection range 1342, the range from the first reference point 1361 to a second reference point 1364 within the first selection range 1341 corresponds to the second selection range 1351, and the range from the first reference point 1361 to a third reference point 1365 within the third selection range 1342 corresponds to the fourth selection range 1352.

The adjustment knob image 132 (second interface) is slidable from the second reference point 1364 to the third reference point 1365 by the user.

The operation mode selection image 133 may include a mark 137 indicating the previous operation mode and the magnitude thereof.

Fourth Modified Example

In the first embodiment, the operation mode selection image is formed in a bar-like shape, as shown in FIGS. 13 and 14. In the present disclosure, however, the operation mode selection image is not restricted to this configuration, and may include plural numbers arranged symmetrically with respect to 0.

Figure 24:
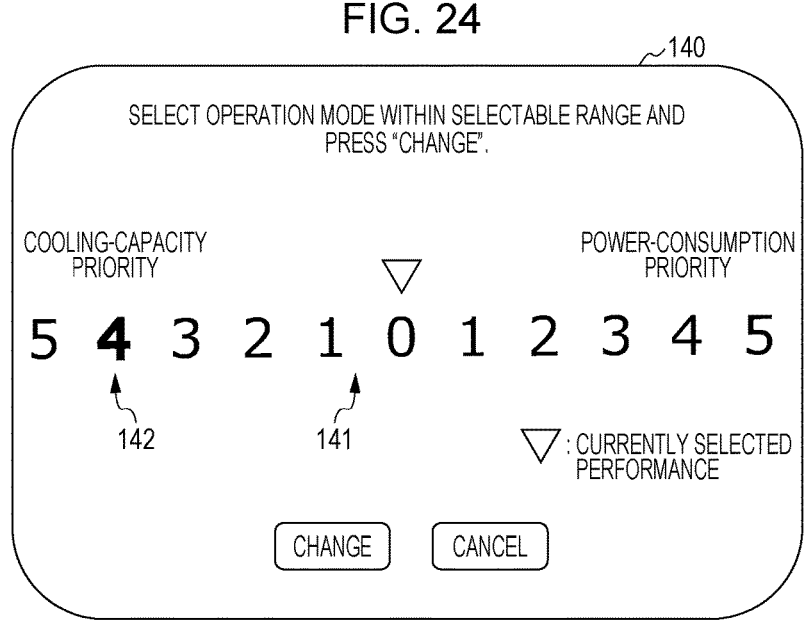
FIG. 24 illustrates an example of an operation mode selection image displayed at the time of purchase of an air conditioner in a fourth modified example of the first embodiment.
Figure 25:
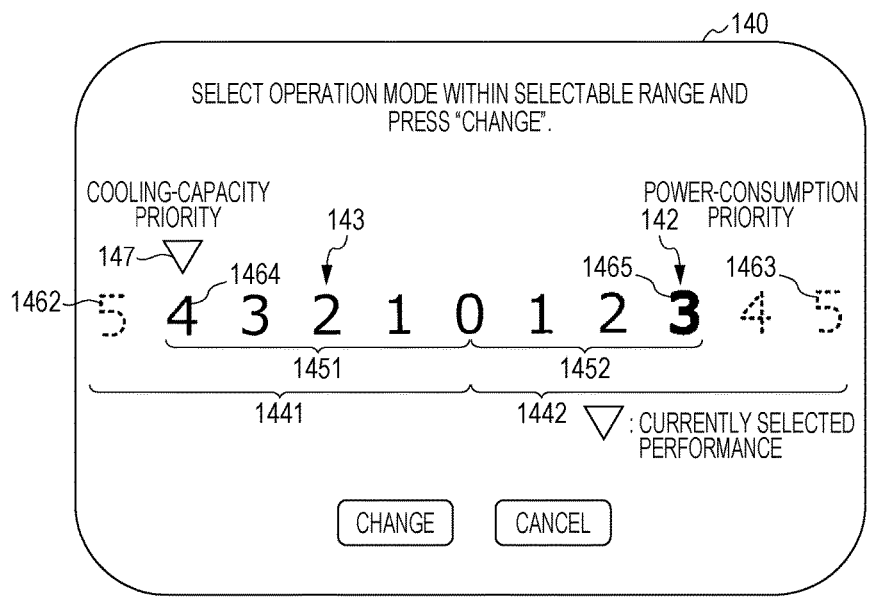
FIG. 25 illustrates an example of an operation mode selection image displayed after the performance of an air conditioner has decreased in the fourth modified example of the first embodiment.

FIG. 24 illustrates an example of an operation mode selection image 141 displayed at the time of purchase of the air conditioner 2 in a fourth modified example of the first embodiment. FIG. 25 illustrates an example of an operation mode selection image 143 displayed after the performance of the air conditioner 2 has decreased in the fourth modified example of the first embodiment.

As shown in FIG. 24, the operation mode selection image 141 is displayed on a screen 140 of the display 54. The operation mode selection image 141 includes plural numbers arranged symmetrically with respect to 0. The number at the left end of the operation mode selection image 141 corresponds to a position at which the first operation mode is selected, while the number at the right end corresponds to a position at which the second operation mode is selected. The numbers on the left side with respect to 0 corresponds to the first operation mode (cooling-capacity priority), while the numbers on the right side with respect to 0 corresponds to the second operation mode (power-consumption priority). The user selects a desired operation mode by selecting the number displayed on the operation mode selection image 141. A number 142 selected by the user is displayed thicker than the other numbers.

As shown in FIG. 25, the operation mode selection image 143 (second image) represents (i) a first selection range 1441 indicating the magnitude range of the first operation mode at the time of purchase of the air conditioner 2, (ii) a second selection range 1451 contained within the first selection range 1441 and indicating the current magnitude range of the first operation mode of the air conditioner 2, (iii) a third selection range 1442 indicating the magnitude range of the second operation mode at the time of purchase of the air conditioner 2, and (iv) a fourth selection range 1452 contained within the third selection range 1442 and indicating the current magnitude range of the second operation mode of the air conditioner 2.

The relationship between the length of the first selection range 1441 and that of the second selection range 1451 represents a degree of decrease in the performance of the air conditioner 2 over the period from the time of purchase to the current time. The relationship between the length of the third selection range 1442 and that of the fourth selection range 1452 represents a degree of decrease in the performance of the air conditioner 2 over the period from the time of purchase to the current time. The operation mode selection image 143 includes a touch panel (second interface) used by the user to select one point on the second and fourth selection ranges 1451 and 1452. The number 142 selected by the user is displayed thicker than the other numbers.

The operation mode selection image 143 includes plural numbers arranged symmetrically with respect to 0. Among the numbers, the numbers ranging from 0 to the left end consecutively increment one by one, while the numbers ranging from 0 to the right end consecutively increment one by one. In FIG. 25, the number at the left end is 5, while the number at the right end is 5. The numbers from 0 to a left end 1462 corresponds to the first selection range 1441, the numbers from a first number 1464, which is positioned closer to 0 than the left end 1462 is, to 0 corresponds to the second selection range 1451, the numbers from 0 to a right end 1463 corresponds to the third selection range 1442, and the numbers from a second number 1465, which is positioned closer to 0 than the right end 1463 is, to 0 corresponds to the fourth selection range 1452.

The user can select the numbers in a range from the first number 1464 to the second number 1465 by using the touch panel (second interface).

The operation mode selection image 143 may include a mark 147 indicating the previous operation mode and the magnitude thereof.

Fifth Modified Example

In the first embodiment, the operation mode selection image is formed in a bar-like shape, as shown in FIGS. 13 and 14. In the present disclosure, however, the operation mode selection image is not restricted to this configuration. The operation mode selection image may include a first operation mode selection image indicating the magnitude range of the first operation mode and a second operation mode selection image indicating the magnitude range of the second operation mode.

Figure 26:
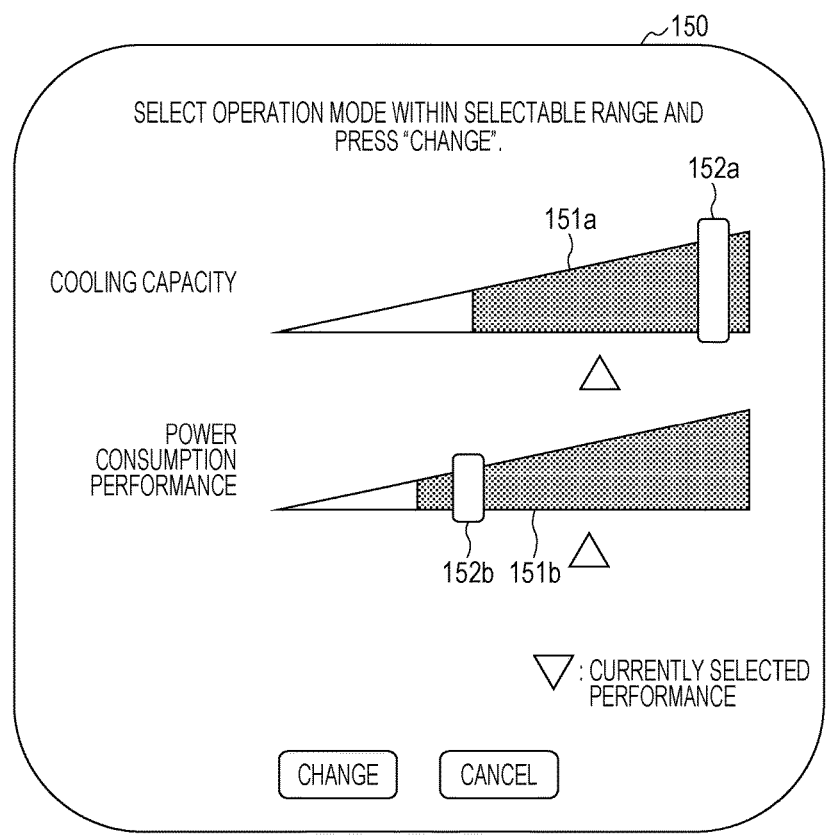
FIG. 26 illustrates an example of an operation mode selection image displayed at the time of purchase of an air conditioner in a fifth modified example of the first embodiment.
Figure 27:
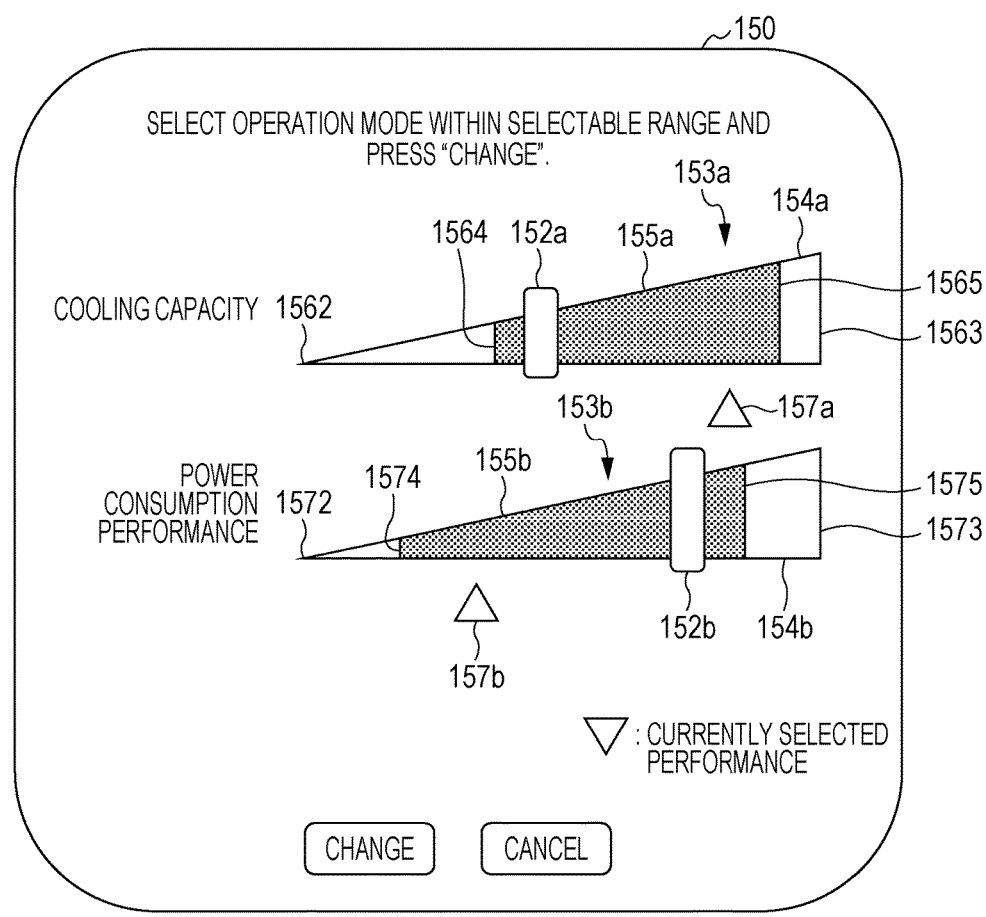
FIG. 27 illustrates an example of an operation mode selection image displayed after the performance of an air conditioner has decreased in the fifth modified example of the first embodiment.

FIG. 26 illustrates an example of an operation mode selection image displayed at the time of purchase of the air conditioner 2 in a fifth modified example of the first embodiment. FIG. 27 illustrates an example of an operation mode selection image displayed after the performance of the air conditioner 2 has decreased in the fifth modified example of the first embodiment.

As shown in FIG. 26, first and second operation mode selection images 151a and 151b are displayed on a screen 150 of the display 54. The first operation mode selection image 151a indicates the selectable range of the first operation mode, while the second operation mode selection image 151b indicates the selectable range of the second operation mode. The first operation mode selection image 151a corresponds to the first operation mode (cooling-capacity priority), while the second operation mode selection image 151b corresponds to the second operation mode (power-consumption priority).

The user selects a desired operation mode by horizontally shifting a first adjustment knob image 152a displayed on the first operation mode selection image 151a or a second adjustment knob image 152b displayed on the second operation mode selection image 151b. The user can increase the cooling capacity by shifting the first adjustment knob image 152a toward the right end of the first operation mode selection image 151a. The user can increase the power consumption performance by shifting the second adjustment knob image 152b toward the right end of the second operation mode selection image 151b.

The first and second adjustment knob images 152a and 152b move together. That is, when the user shifts one of the first and second adjustment knob images 152a and 152b, the other adjustment knob image 152a or 152b is also shifted. When the user shifts the first adjustment knob image 152a toward the right side on the first operation mode selection image 151a, the second adjustment knob image 152b is shifted toward the left side on the second operation mode selection image 151b. When the user shifts the first adjustment knob image 152a toward the left side on the first operation mode selection image 151a, the second adjustment knob image 152b is shifted toward the right side on the second operation mode selection image 151b.

As shown in FIG. 27, a first operation mode selection image 153a represents a first selection range 154a indicating the magnitude range of the first operation mode at the time of purchase of the air conditioner 2 and a second selection range 155a contained within the first selection range 154a and indicating the current magnitude range of the first operation mode of the air conditioner 2. A second operation mode selection image 153b represents a third selection range 154b indicating the magnitude range of the second operation mode at the time of purchase of the air conditioner 2 and a fourth selection range 155b contained within the third selection range 154b and indicating the current magnitude range of the second operation mode of the air conditioner 2.

The relationship between the length of the first selection range 154a and that of the second selection range 155a represents a degree of decrease in the performance of the air conditioner 2 over the period from the time of purchase to the current time. The relationship between the length of the third selection range 154b and that of the fourth selection range 155b represents a degree of decrease in the performance of the air conditioner 2 over the period from the time of purchase to the current time. The first operation mode selection image 153a includes the adjustment knob image 152a (second interface) used by the user to select one point on the second selection range 155a. The second operation mode selection image 153b includes the adjustment knob image 152b (second interface) used by the user to select one point on the fourth selection range 155b.

The first and second operation mode selection images 153a and 153b are formed in a triangular shape. The range from one end 1562 to the other end 1563 of the first operation mode selection image 153a corresponds to the first selection range 154a, and the range from a first reference point 1564 within the first selection range 154a to a second reference point 1565 corresponds to the second selection range 155a. The range from one end 1572 to the other end 1573 of the second operation mode selection image 153b corresponds to the third selection range 154b, and the range from a third reference point 1574 within the third selection range 154b to a fourth reference point 1575 corresponds to the fourth selection range 155b.

The first adjustment knob image 152a (second interface) is slidable from the first reference point 1564 to the second reference point 1565 by the user. The second adjustment knob image 152b (second interface) is slidable from the third reference point 1574 to the fourth reference point 1575 by the user.

The first operation mode selection image 153a may include a mark 157a indicating the previous operation mode and the magnitude thereof. The second operation mode selection image 153b may include a mark 157b indicating the previous operation mode and the magnitude thereof.

In the fifth modified example, the second selection range 155a is defined by the range from the first reference point 1564 to the second reference point 1565 of the first operation mode selection image 153a. However, the second selection range 155a may be defined by the range from the end 1562 to the second reference point 1565 of the first operation mode selection image 153a.

Similarly, in the fifth modified example, the fourth selection range 155b is defined by the range from the third reference point 1574 to the fourth reference point 1575 of the second operation mode selection image 153b. However, the fourth selection range 155b may be defined by the range from the end 1572 to the fourth reference point 1575 of the second operation mode selection image 153b.

Second Embodiment

In the above-described first embodiment, to calculate the performance of the air conditioner 2, the control parameter changing assisting device 1 obtains the performance of another air conditioner operated by using another control parameter. In a second embodiment, instead of obtaining the performance of another air conditioner, the control parameter changing assisting device test-operates the air conditioner 2 by using another control parameter so as to obtain the performance different from the current performance of the air conditioner 2.

Figure 28:
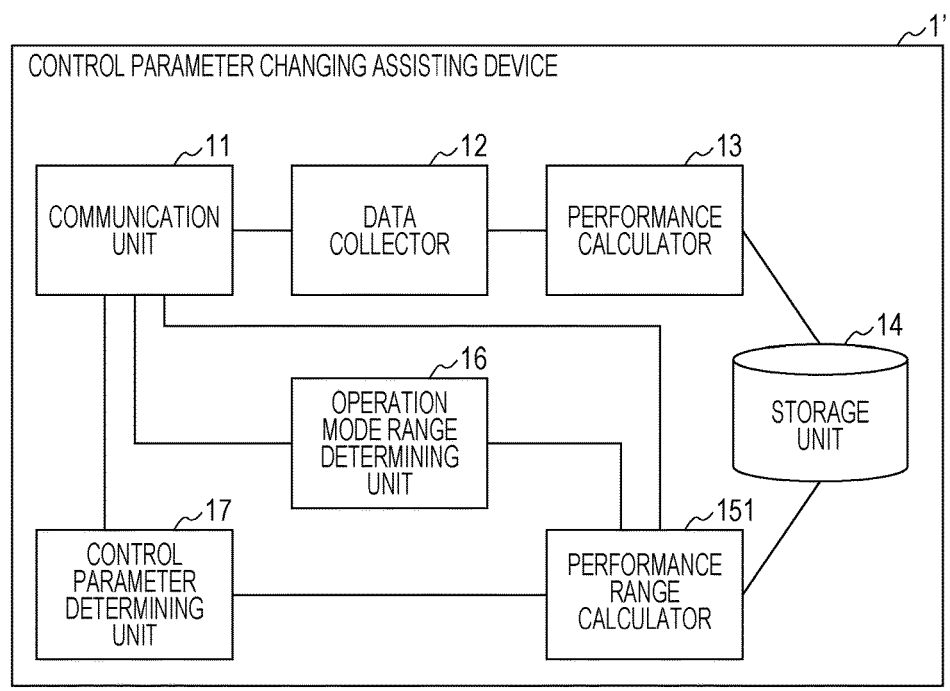
FIG. 28 is a block diagram illustrating an example of the configuration of a control parameter changing assisting device in a second embodiment of the present disclosure.

FIG. 28 is a block diagram illustrating an example of the configuration of a control parameter changing assisting device 1' in the second embodiment. The configuration of the operation control system in the second embodiment is the same as that of the first embodiment shown in FIG. 1, and an explanation thereof will thus be omitted. The configurations of the air conditioner 2 and the terminal device 5 in the second embodiment are the same as those of the first embodiment shown in FIGS. 3 and 4, respectively, and an explanation thereof will thus be omitted.

The control parameter changing assisting device 1' shown in FIG. 28 includes a communication unit 11, a data collector 12, a performance calculator 13, a storage unit 14, a performance range calculator 151, an operation mode range determining unit 16, and a control parameter determining unit 17. Except for the configuration of the performance range calculator 151, the configuration of the control parameter changing assisting device 1' is the same as that of the first embodiment shown in FIG. 2, and an explanation thereof will thus be omitted.

The performance range calculator 151 calculates the range of the decreased performance of the air conditioner 2 that varies within a range in which the control parameter can be changed.

The performance range calculator 151 calculates the average of the performance of the air conditioner 2 for a predetermined period as the current performance. The data collector 12 obtains a first operating state of the air conditioner 2 operated by using a first control parameter. The performance calculator 13 calculates the performance of the air conditioner 2, based on the first operating state, and stores the calculated performance in the storage unit 14. The performance range calculator 151 calculates the average of the performance produced for a predetermined period by operating the air conditioner 2 with the first control parameter, and sets the calculated average to be a first performance representing the current performance of the air conditioner 2.

The performance range calculator 151 sends a test-operation instruction to the air conditioner 2 via the communication unit 11. The test-operation instruction is to test-operate the air conditioner 2 by using a second control parameter different from the first control parameter. The data collector 12 obtains a second operating state of the air conditioner 2 operated by using the second control parameter. The performance calculator 13 calculates the performance of the air conditioner 2, based on the second operating state, and stores the calculated performance in the storage unit 14. The performance range calculator 151 calculates the average of the performance produced for a predetermined period by operating the air conditioner 2 with the second control parameter, and sets the calculated average to be a second performance representing the performance of the air conditioner 2 during the test operation.

The performance range calculator 151 calculate the range of the performance based on a straight line connecting the calculated first performance and the calculated second performance.

Control parameter changing processing in the second embodiment will now be described below.

Figure 29:
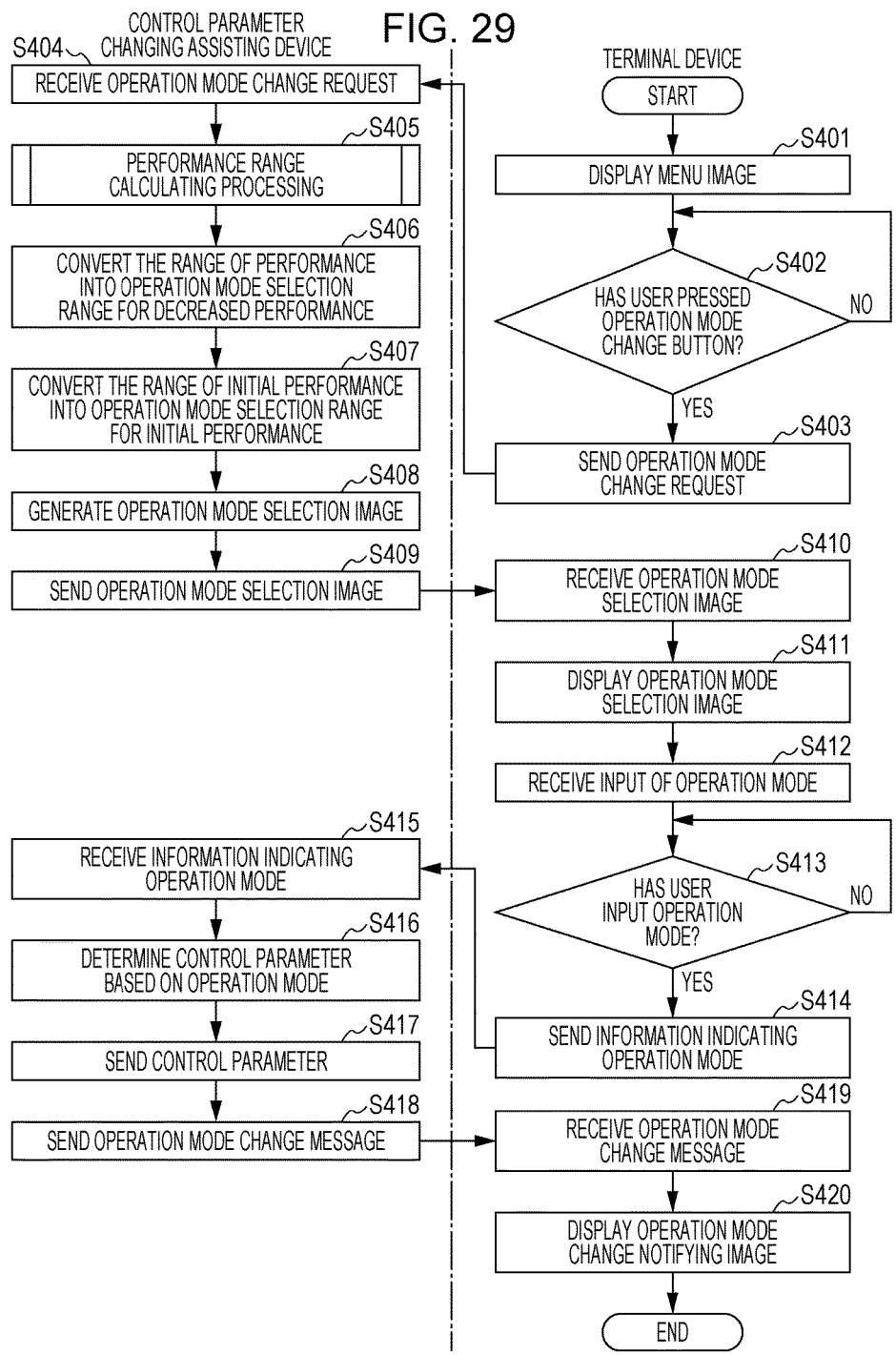
FIG. 29 is a flowchart illustrating control parameter changing processing in the second embodiment.

FIG. 29 is a flowchart illustrating control parameter changing processing in the second embodiment.

Steps S401 through S404 are similar to steps S101 through S104 in FIG. 7, and an explanation thereof will thus be omitted.

Then, in step S405, the performance range calculator 151 of the control parameter changing assisting device 1' performs performance range calculating processing for calculating the range of the decreased performance of the air conditioner 2 that varies within a range in which the control parameter can be changed. Performance range calculating processing will be discussed below with reference to FIG. 30.

Figure 30:
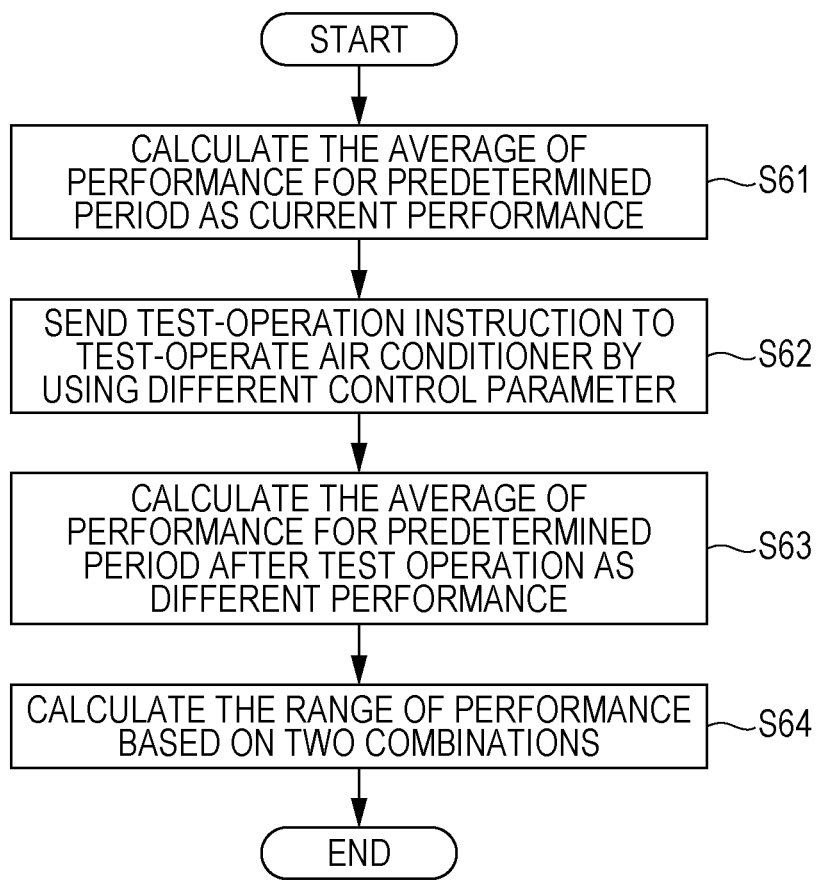
FIG. 30 is a flowchart illustrating performance range calculating processing in FIG. 29.

FIG. 30 is a flowchart illustrating performance range calculating processing in step S405 of FIG. 29.

In step S61, the performance range calculator 151 calculates the average of the performance of the air conditioner 2 for a predetermined period as the current performance. That is, the performance range calculator 151 calculates the average of the performance of the air conditioner 2 produced during the latest several hours as the current performance.

Then, in step S62, the performance range calculator 151 sends a test-operation instruction to the air conditioner 2 via the communication unit 11. The test-operation instruction is to test-operate the air conditioner 2 by using a control parameter different from the current control parameter. A different control parameter is a parameter having an ID number different from the current control parameter. For example, if the ID number of the current control parameter is "4", the ID number of the different control parameter is "14".

The first communication unit 214 of the air conditioner 2 receives the test-operation instruction. The operation controller 212 test-operates the air conditioner 2 by using a different control parameter in accordance with the test-operation instruction. The first communication unit 214 then sends the operating state of the air conditioner 2 indicating, for example, sensor data obtained by various sensors of the air conditioner 2 to the control parameter changing assisting device 1'. The data collector 12 of the control parameter changing assisting device 1' obtains the operating state of the air conditioner 2 and the different control parameter from the air conditioner 2. The performance calculator 13 calculates the performance of the air conditioner 2, based on the operating state obtained by the data collector 12. The performance calculator 13 then stores the operating state and the different control parameter obtained by the data collector 12 and the performance calculated by the performance calculator 13 in the storage unit 14.

Then, in step S63, the performance range calculator 151 calculates the average of the performance of the air conditioner 2 produced for a predetermined period after the test operation, and sets the calculated average to be a different performance. That is, the performance range calculator 151 calculates the average of the performance of the air conditioner 2 produced for a period from the time at which the test operation started to the current time, and sets the calculated average to be the performance different from the current performance.

Then, in step S64, the performance range calculator 151 calculates the range of the performance, based on a first combination of the current control parameter and the current performance and a second combination of the different control parameter and the different performance. The approach to calculating the range of the performance based on the first and second combinations is the same as that discussed in the first embodiment, and an explanation thereof will thus be omitted.

Referring back to FIG. 29, in step S406, the operation mode range determining unit 16 converts the range of the performance calculated by the performance range calculator 151 into an operation mode selection range for the decreased performance.

Steps S406 through S420 are similar to steps S106 through S120 in FIG. 7, and an explanation thereof will thus be omitted. In the second embodiment, it is not necessary to obtain a combination of a different control parameter and a different performance from another air conditioner. This eliminates the need for the control parameter changing assisting device 1' to execute steps S121 and S122 in FIG. 7. That is, there is no need to calculate the performance after the operation mode has changed or to store the control parameters and the performances prior to and subsequent to a change in the operation mode.

To perform the test operation, the air conditioner 2 needs to suspend the current operation. Before sending a test-operation instruction to the air conditioner 2, the control parameter changing assisting device 1' may send a test-operation inquiry image for asking a user whether to start a test operation to the terminal device 5.

Figure 31:
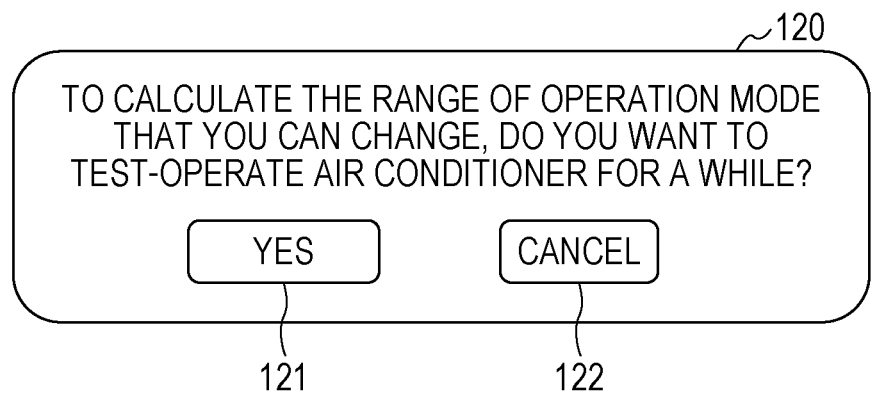
FIG. 31 illustrates an example of a test-operation inquiry image displayed on a terminal device.

FIG. 31 illustrates an example of a test-operation inquiry image 120 displayed on the terminal device 5.

Before sending a test-operation instruction to the air conditioner 2, the communication unit 11 sends the test-operation inquiry image 120 for asking the user whether to start a test operation to the terminal device 5. The communication unit 51 of the terminal device 5 receives the test-operation inquiry image 120 from the control parameter changing assisting device 1'. The display 54 displays the test-operation inquiry image 120 received by the communication unit 51.

As shown in FIG. 31, the test-operation inquiry image 120 includes a test-operation instruction button 121 for selecting to perform a test operation and a cancel button 122 for selecting not to perform a test operation. The input unit 55 receives an instruction concerning whether to perform a test operation from the user. Upon receiving an instruction by the input unit 55, the communication unit 51 sends information whether to perform a test operation to the control parameter changing assisting device 1'. The communication unit 11 of the control parameter changing assisting device 1' receives this information. If the information indicates that the user has selected to perform a test operation, the performance range calculator 151 sends a test-operation instruction to the air conditioner 2 via the communication unit 11. If the information indicates that the user has selected not to perform a test operation, the performance range calculator 151 terminates performance range calculating processing and also terminates control parameter changing processing.

First Modified Example

In the second embodiment, pressing of the operation mode change button 161 displayed on the menu image 160 triggers the execution of control parameter changing processing. In the present disclosure, however, the execution of control parameter changing processing may start when the performance of the air conditioner 2 has decreased to a level lower than a predetermined value.

Figure 32:
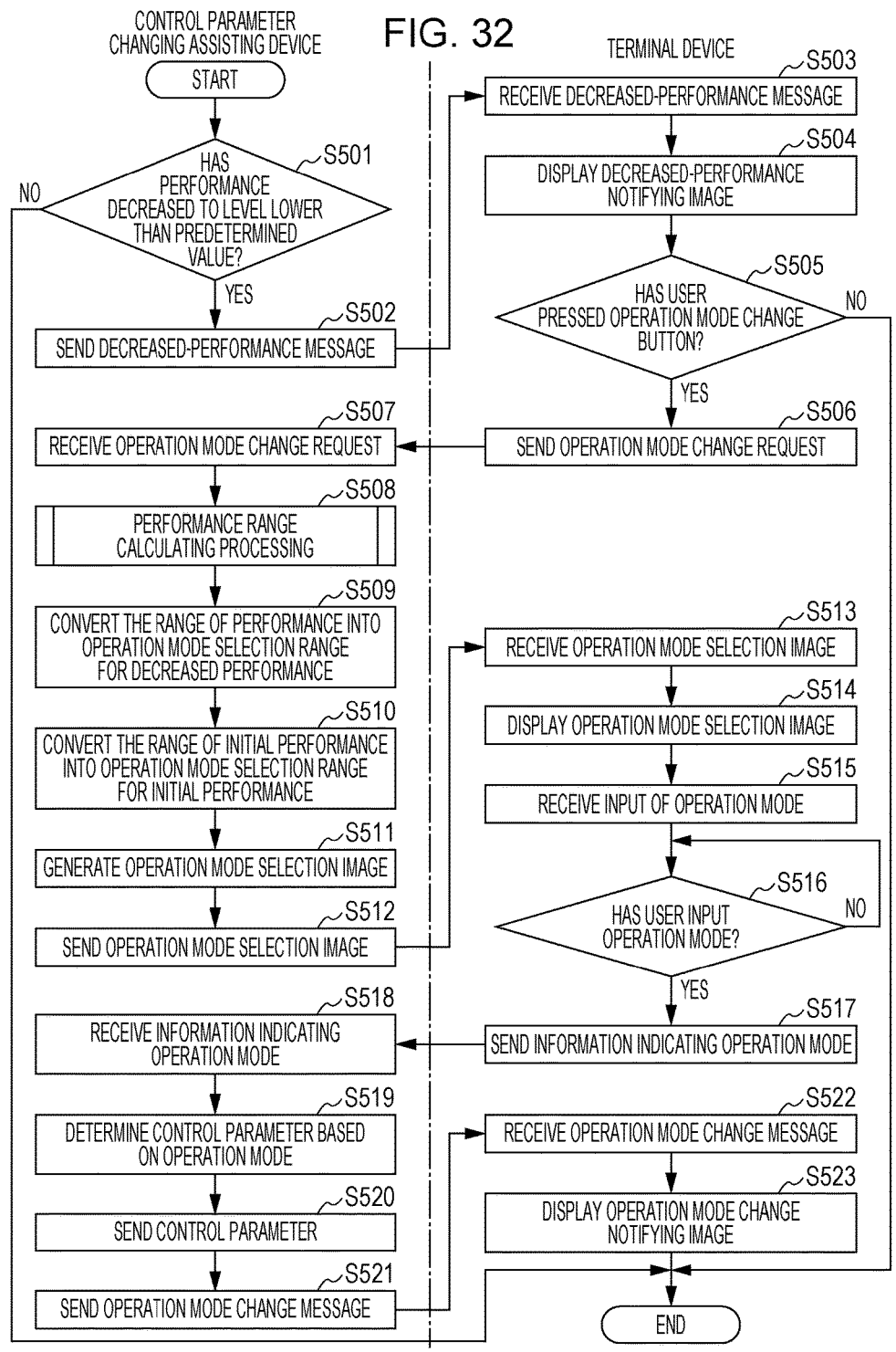
FIG. 32 is a flowchart illustrating control parameter changing processing in a first modified example of the second embodiment.

FIG. 32 is a flowchart illustrating control parameter changing processing in a first modified example of the second embodiment.

Steps S501 through S507 are similar to steps S201 through S207 in FIG. 16, and an explanation thereof will thus be omitted. Steps S508 through S523 are similar to steps S405 through S420 in FIG. 29, and an explanation thereof will thus be omitted.

Second Modified Example

In the second embodiment, pressing of the operation mode change button 161 displayed on the menu image 160 triggers the execution of control parameter changing processing. In the present disclosure, however, the elapse of a predetermined time after the operation mode has previously changed may trigger the execution of control parameter changing processing.

Figure 33:
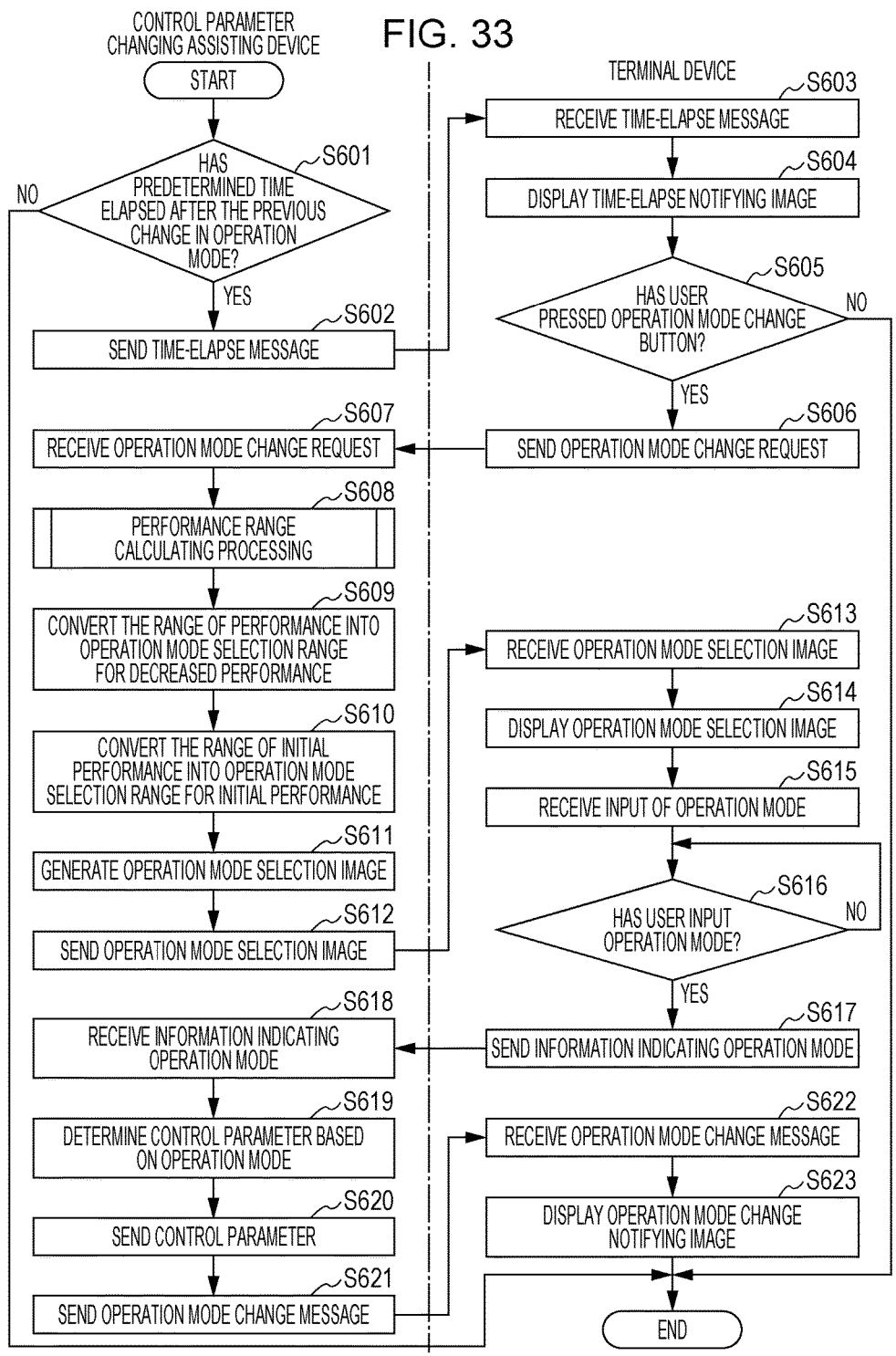
FIG. 33 is a flowchart illustrating control parameter changing processing in a second modified example of the second embodiment.

FIG. 33 is a flowchart illustrating control parameter changing processing in a second modified example of the second embodiment.

Steps S601 through S607 are similar to steps S301 through S307 in FIG. 19, and an explanation thereof will thus be omitted. Steps S608 through S623 are similar to steps S405 through S420 in FIG. 29, and an explanation thereof will thus be omitted.

The first embodiment and the second embodiment may be combined with each other. That is, if the control parameter changing assisting device 1 fails to obtain a combination of a different control parameter and a different performance of another air conditioner in performance range calculating processing in the first embodiment, it may perform performance range calculating processing in the second embodiment to obtain a combination of a different control parameter and a different performance by test-operating the air conditioner 2.

In the present disclosure, some or all of the units, devices, and members or sections or some or all of the functional blocks in the block diagrams may be implemented by one or plural electronic circuits including a semiconductor device, a semiconductor integrated circuit (IC), and a large scale integrated (LSI) circuit. An LSI or IC may be integrated into one chip or distributed over plural chips. For example, the functional blocks other than storage elements may be integrated into one chip. An LSI or an IC may be called a system LSI, a very large scale integrated (VLSI) circuit, or an ultra LSI, depending on the integration degree. Instead of an LSI or an IC, a field programmable gate array (FPGA) that is programmable after it is manufactured, or a reconfigurable logic device that may reconfigure connections or settings of circuit cells within this device may be used for the same purpose.

The functions or operations of some or all of the units, devices, and members or sections may be executed by software. In this case, software is recorded on one or plural non-transitory recording media, such as read only memories (ROMs), optical discs, and hard disks. When software is executed by a processor, the functions specified by this software are executed by the processor and a peripheral device. The system or the device may include one or plural non-transitory recording media having software recorded thereon, a processor, and desirable hardware devices, such as an interface.

The control method for an air conditioner, the terminal device, and the operation control system according to an aspect of the present disclosure are suitably used as a control method for an air conditioner, a terminal device, and an operation control system, because it is possible to present the range of the operation mode of the air conditioner that is selectable by a user in accordance with the decreased performance and also to operate the air conditioner within the operation mode selection range for the decreased performance.

What is claimed is:
1. A control method for an air conditioner, comprising:
causing a terminal device to display a first image, the first image including a first interface for selecting whether to change an operation mode of the air conditioner, the operation mode including a first mode of power consumption and a second mode of power consumption;
causing the terminal device to display a second image upon receiving, from the terminal device, first information indicating a selection to change the operation mode, the second image displays:
a first range of power consumption setting values that are selectable in the first mode at a time of purchase of the air conditioner, the first range including power consumption setting values from a first end value to a second end value,
a second range of power consumption setting values contained within the first range that are selectable in the first mode at a current time, the second range including a subset of the power consumption setting values from the first end value to a third end value that is smaller than the second end value,
a third range of power consumption setting values that are selectable in the second mode at the time of purchase of the air conditioner, the third range including power consumption setting values from a fourth end value to a fifth end value, a fourth range of power consumption setting values contained within the third range that are selectable in the second mode at the current time, the fourth range including a subset of the power consumption setting values from the fourth end value to a sixth end value that is smaller than the fifth end value, a relationship between a size of the first range and a size of the second range representing a degree of decrease in performance of the air conditioner in the first mode over a period from the time of purchase to the current time, a relationship between a size of the third range and a size of the fourth range representing a degree of decrease in the performance of the air conditioner in the second mode over a period from the time of purchase to the current time, and a second interface for selecting a target power consumption setting value on the second and fourth ranges, wherein the second interface is slidable within the second range and the fourth range but not to the second end value included in the first range or the fifth end value included in the third range;

receiving, from the terminal device, second information indicating a current operation mode and the target power consumption setting value of the current operation mode selected using the second interface; and sending, to the air conditioner, a command for controlling the air conditioner by using the current operation mode and the target power consumption setting value of the current operation mode.

2. The control method according to claim 1, wherein:
the first mode is a high power mode; and
the second mode is a power-saving mode.

3. The control method according to claim 1, further comprising:
receiving, from the air conditioner, third information indicating that the air conditioner is powered ON;
determining whether an elapsed time, from a time at which the operation mode was previously changed to a time at which the third information is received, exceeds a predetermined period; and
causing the terminal device to display the first image if it is determined that the elapsed time exceeds the predetermined period.

4. The control method according to claim 1, wherein the second image also indicates a previous operation mode that was used before the current operation mode and a target value of the power consumption setting that was selected in the previous operation mode.

5. The control method according to claim 1, wherein:
the second image has a bar-like shape.

6. The control method according to claim 1, wherein:
the second image has an arc-like shape.

7. The control method according to claim 1, wherein:
the second image includes a plurality of numbers arranged symmetrically with respect to a number 0;
among the plurality of numbers, numbers from the number 0 to a left end of the second image are consecutively incremented one by one, while numbers from the number 0 to a right end of the second image are consecutively incremented one by one;
numbers from the number 0 to the left end corresponds to the first range, numbers from a first number, which is positioned closer to the number 0 than the left end is, to the number 0 corresponds to the second range, numbers from the number 0 to the right end corresponds to the third range, and numbers from a second number, which is positioned closer to the number 0 than the right end is, to the number 0 corresponds to the fourth range; and
numbers in a range from the first number to the second number are selectable using the second interface.

8. The control method according to claim 1, further comprising:
obtaining fourth information indicating an association between individual values of power consumption setting of the second range and parameter sets for operating the air conditioner, and an association between individual values of power consumption setting of the fourth range and parameter sets for operating the air conditioner; and
selecting a parameter set for operating the air conditioner, based on the second information and the fourth information,
wherein the command includes a command for controlling the air conditioner by using the selected parameter set.

9. The control method according to claim 8, wherein:
the air conditioner includes a compressor and a fan motor; and
the parameter set indicates a target rotational speed of the compressor and a target rotational speed of the fan motor.

10. A terminal device for receiving a selection of an operation mode of an air conditioner, comprising:
a processor;
a monitor; and
a communicator,
wherein
the processor controls the monitor to display a first image, the first image including a first interface for selecting whether to change an operation mode of the air conditioner, the operation mode including a first mode of power consumption and a second mode of power consumption,
the processor controls the monitor to display a second image when a selection to change the operation mode is received, the second image displays:
a first range of power consumption setting values that are selectable in the first mode at a time of purchase of the air conditioner, the first range including power consumption setting values from a first end value to a second end value,
a second range of power consumption setting values contained within the first range that are selectable in the first mode at a current time, the second range including a subset of the power consumption setting values from the first end value to a third end value that is smaller than the second end value,
a third range of power consumption setting values that are selectable in the second mode at the time of purchase of the air conditioner, the third range including power consumption setting values from a fourth end value to a fifth end value,
a fourth range of power consumption setting values contained within the third range that are selectable in the second mode at the current time, the fourth range including a subset of the power consumption setting values from the fourth end value to a sixth end value that is smaller than the fifth end value,
a relationship between a size of the first range and a size of the second range representing a degree of decrease in performance of the air conditioner in the first mode over a period from the time of purchase to the current time, a relationship between a size of the third range and a size of the fourth range representing a degree of decrease in the performance of the air conditioner in the second mode over a period from the time of purchase to the current time, and a second interface for selecting a target power consumption setting value on the second and fourth ranges, wherein the second interface is slidable within the second range and the fourth range but not to the second end value included in the first range or the fifth end value included in the third range, and the communicator sends information indicating a current operation mode and the target power consumption setting value of the current operation mode that is selected using the second interface.

11. An operation control system comprising:
an air conditioner;
a terminal device that receives a selection of an operation mode of the air conditioner; and
an operation control device that determines a control parameter for controlling an operation of the air conditioner in accordance with the selected operation mode received by the terminal device, and that controls the operation of the air conditioner in accordance with the determined control parameter,
the operation control device including
a processor, and
a communicator, wherein
the processor causes the terminal device to display a first image, the first image including a first interface for selecting whether to change the operation mode of the air conditioner, the operation mode including a first mode of power consumption and a second mode of power consumption,
the processor causes the terminal device to display a second image upon receiving, from the terminal device, first information indicating a selection to change the operation mode, the second image displays:
a first range indicating a range of power consumption setting values that are selectable in the first mode at a time of purchase of the air conditioner, the first range including power consumption setting values from a first end value to a second end value,
a second range of power consumption setting values contained within the first range that are selectable in the first mode at a current time, the second range including a subset of the power consumption setting values from the first end value to a third end value that is smaller than the second end value,
a third range indicating a range of power consumption setting values that are selectable in the second mode at the time of purchase of the air conditioner, the third range including power consumption setting values from a fourth end value to a fifth end value,
a fourth range of power consumption setting values contained within the third range that are selectable in the second mode at the current time, the fourth range including a subset of the power consumption setting values from the fourth end value to a sixth end value that is smaller than the fifth end value,
a relationship between a size of the first range and a size of the second range representing a degree of decrease in performance of the air conditioner in the first mode over a period from the time of purchase to the current time, and
a relationship between a size of the third range and a size of the fourth range representing a degree of decrease in the performance of the air conditioner in the second mode over a period from the time of purchase to the current time, and
a second interface for selecting a target power consumption setting value on the second and fourth ranges, wherein the second interface is slidable within the second range and the fourth range but not to the second end value included in the first range or the fifth end value included in the third range,
the communicator receives, from the terminal device, second information indicating a current operation mode and the target power consumption setting value of the current operation mode selected using the second interface, and
the communicator sends, to the air conditioner, a command for controlling the air conditioner by using the current operation mode and the target power consumption setting value of the current operation mode,
the terminal device including
a processor,
a monitor, and
a communicator, wherein
the processor controls the monitor to display the first image,
the processor controls the monitor to display the second image when a selection to change the operation mode is received, and
the communicator sends the second information to the operation control device, the air conditioner including
a processor, and
a communicator, wherein
the communicator receives the command from the operation control device, and
the processor operates the air conditioner in accordance with the command.

12. The control method according to claim 1, wherein:
the second range and the fourth range are determined based on one or more operation parameters of the air conditioner.

* * * * *